US009589357B2

(12) United States Patent
Li et al.

(10) Patent No.: US 9,589,357 B2
(45) Date of Patent: Mar. 7, 2017

(54) AVATAR-BASED VIDEO ENCODING

(71) Applicants: INTEL CORPORATION, Santa Clara, CA (US); Wenlong Li, Beijing (CN); Yangzhou Du, Beijing (CN); Xiaofeng Tong, Beijing (CN)

(72) Inventors: Wenlong Li, Beijing (CN); Yangzhou Du, Beijing (CN); Xiaofeng Tong, Beijing (CN)

(73) Assignee: Intel Corporation, Santa Clara, CA (US)

( * ) Notice: Subject to any disclaimer, the term of this patent is extended or adjusted under 35 U.S.C. 154(b) by 121 days.

(21) Appl. No.: 14/127,457

(22) PCT Filed: Jun. 4, 2013

(86) PCT No.: PCT/CN2013/000669
§ 371 (c)(1),
(2) Date: Dec. 18, 2013

(87) PCT Pub. No.: WO2014/194439
PCT Pub. Date: Dec. 11, 2014

(65) Prior Publication Data
US 2015/0213604 A1    Jul. 30, 2015

(51) Int. Cl.
*G06T 15/00* (2011.01)
*G06T 7/00* (2006.01)
(Continued)

(52) U.S. Cl.
CPC ........ *G06T 7/0042* (2013.01); *G06K 9/00281* (2013.01); *G06K 9/00315* (2013.01);
(Continued)

(58) Field of Classification Search
CPC ....... G06T 13/40; G06T 7/0042; G06T 13/80; G06T 2207/30201; H04N 7/157; H04N 9/00281; G06K 9/00281; G06K 9/00315
(Continued)

(56) References Cited

U.S. PATENT DOCUMENTS 6,072,496 A    6/2000  Guenter et al.
6,545,682 B1 *  4/2003  Ventrella et al. ............. 345/473
(Continued)

FOREIGN PATENT DOCUMENTS

CN    1920886 A    2/2007
CN    10-1098241 A    1/2008
(Continued)

OTHER PUBLICATIONS

S. Morishima and T. Yotsukura, "Face-to-face communicative avatar driven by voice," in Proc. 1999 IEEE Int. Conf. Image Processing (CD-ROM), pp. 11-15 vol. 3; Oct. 24, 1999.*
(Continued)

*Primary Examiner* — Phu K Nguyen
(74) *Attorney, Agent, or Firm* — Finch & Maloney PLLC

(57) ABSTRACT

Techniques are disclosed for performing avatar-based video encoding. In some embodiments, a video recording of an individual may be encoded utilizing an avatar that is driven by the facial expression(s) of the individual. In some such cases, the resultant avatar animation may accurately mimic facial expression(s) of the recorded individual. Some embodiments can be used, for example, in video sharing via social media and networking websites. Some embodiments can be used, for example, in video-based communications (e.g., peer-to-peer video calls; videoconferencing). In some instances, use to the disclosed techniques may help to reduce communications bandwidth use, preserve the individual's
(Continued)

anonymity, and/or provide enhanced entertainment value (e.g., amusement) for the individual, for example.

25 Claims, 11 Drawing Sheets

(51) Int. Cl.
- *G06T 13/40* (2011.01)
- *H04N 7/14* (2006.01)
- *H04N 7/15* (2006.01)
- *G06K 9/00* (2006.01)
- *G06T 13/80* (2011.01)

(52) U.S. Cl.
CPC .............. *G06T 13/40* (2013.01); *G06T 13/80* (2013.01); *H04N 7/147* (2013.01); *H04N 7/157* (2013.01); *G06T 2207/30201* (2013.01)

(58) Field of Classification Search
USPC ........................................ 345/473, 474, 475
See application file for complete search history.

(56) References Cited

U.S. PATENT DOCUMENTS

| | | | |
|---|---|---|---|
| 7,116,330 B2 * | 10/2006 | Marshall et al. | 345/474 |
| 7,564,476 B1 * | 7/2009 | Coughlan et al. | 348/14.08 |
| 2008/0136814 A1 | 6/2008 | Chu et al. | |
| 2008/0170777 A1 | 7/2008 | Sullivan et al. | |
| 2011/0304629 A1 * | 12/2011 | Winchester | 345/473 |

FOREIGN PATENT DOCUMENTS

| | | |
|---|---|---|
| CN | 10-1217511 A | 7/2008 |
| CN | 10-1826217 A | 9/2010 |
| CN | 10-2158816 A | 8/2011 |
| WO | 2009/128784 A1 | 10/2009 |
| WO | 2011/127309 A1 | 10/2011 |
| WO | 2012/139276 A1 | 10/2012 |
| WO | 2013/074153 A1 | 5/2013 |
| WO | 2014/036708 A1 | 3/2014 |

OTHER PUBLICATIONS

Shigeo Morishima, "Face Analysis and Synthesis", IEEE Signal Processing Magazine, vol. 18, No. 3, pp. 26-34, May 2001.*
International Search Report and Written Opinion received for PCT Patent Application No. PCT/CN2013/000669, mailed on Mar. 13, 2014, 12 pages.
International Search Report and Written Opinion received for PCT Patent Application No. PCT/CN2012/081061, mailed on Jun. 13, 2013, 13 pages.
International Search Report and Written Opinion received for PCT Patent Application No. PCT/CN2011/072603, mailed on Oct. 27, 2011, 11 pages.
International Preliminary Report on Patentability and Written Opinion received for PCT Patent Application No. PCT/CN2011/072603, mailed on Oct. 24, 2013, 8 pages.
"Stargreetz", retrieved from http://corp.stargreetz.com/, retrieved on Apr. 4, 2013, pp. 1-2 as printed.
"Tom's Messenger—Android Apps on Google Play", retrieved from https://play.google.com/store/apps/details?id=com.outfit7.tomsmessengerfree, retrieved on Apr. 4, 2013, pp. 1-2 as printed.
"WeChat—The New Way to Connect", retrieved from http://www.wechat.com/en/, retrieved on Apr. 4, 2013, pp. 1-2 as printed.
Blanz et al., "A Statistical Method for Robust 3D Surface Reconstruction from Sparse Data", Proceedings of 2nd International Symposium on 3D Data Processing, Visualization and Transmission, Sep. 6-9, 2004, pp. 1-8 as printed.
Viola et al., "Rapid Object Detection using a Boosted Cascade of Simple Features", Proceedings of the 2001 IEEE Computer Society Conference on Computer Vision and Pattern Recognition, vol. 1, 2001, pp. 1-9 as printed.

\* cited by examiner

Figure 3A
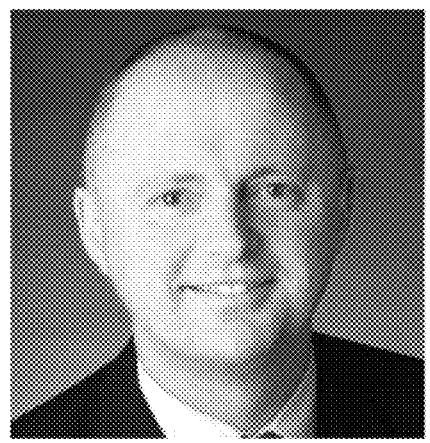
400
Figure 3B
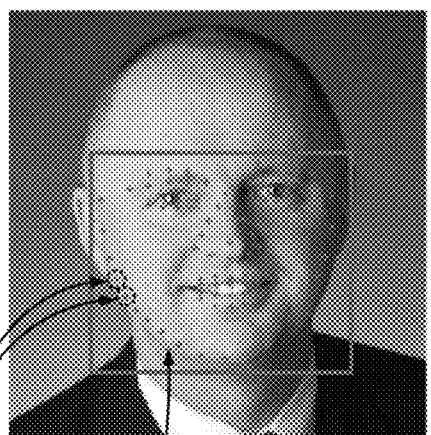
404   406   402
Figure 3C
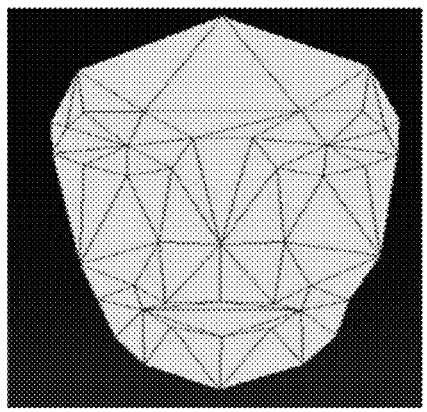
408a
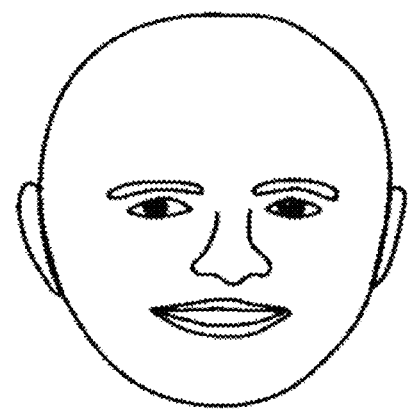
Figure 3D
408b
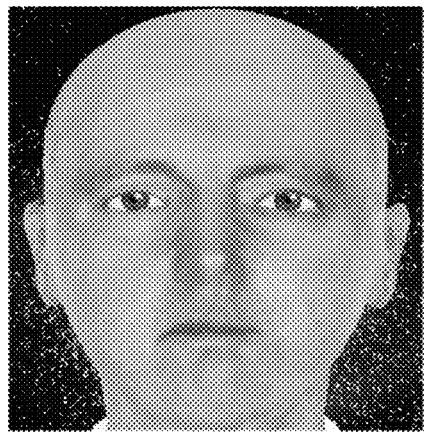
Figure 3E Figure 8
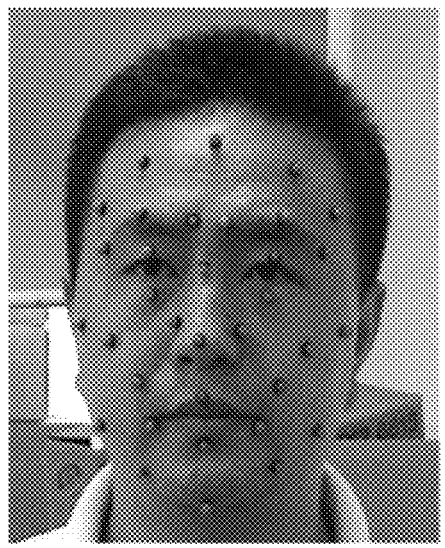
  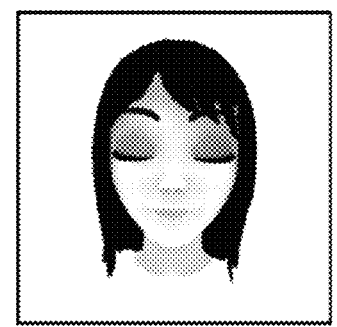
Figure 9A          Figure 9B          Figure 9C

AVATAR-BASED VIDEO ENCODING

BACKGROUND

Mobile communications involve a number of non-trivial challenges, and mobile video sharing and video-based communications have faced particular complications.

BRIEF DESCRIPTION OF THE DRAWINGS

FIGS. 3A-3E illustrate example facial control parameters and generation of an avatar animation in accordance with an embodiment of the present disclosure.

FIG. 8 illustrates a human face having a plurality of motion capture markers affixed thereto, in accordance with an embodiment of the present disclosure.

FIGS. 9A-9C illustrate several example screenshot images of various example avatar expressions, in accordance with an embodiment of the present disclosure.

DETAILED DESCRIPTION

Figure 1:
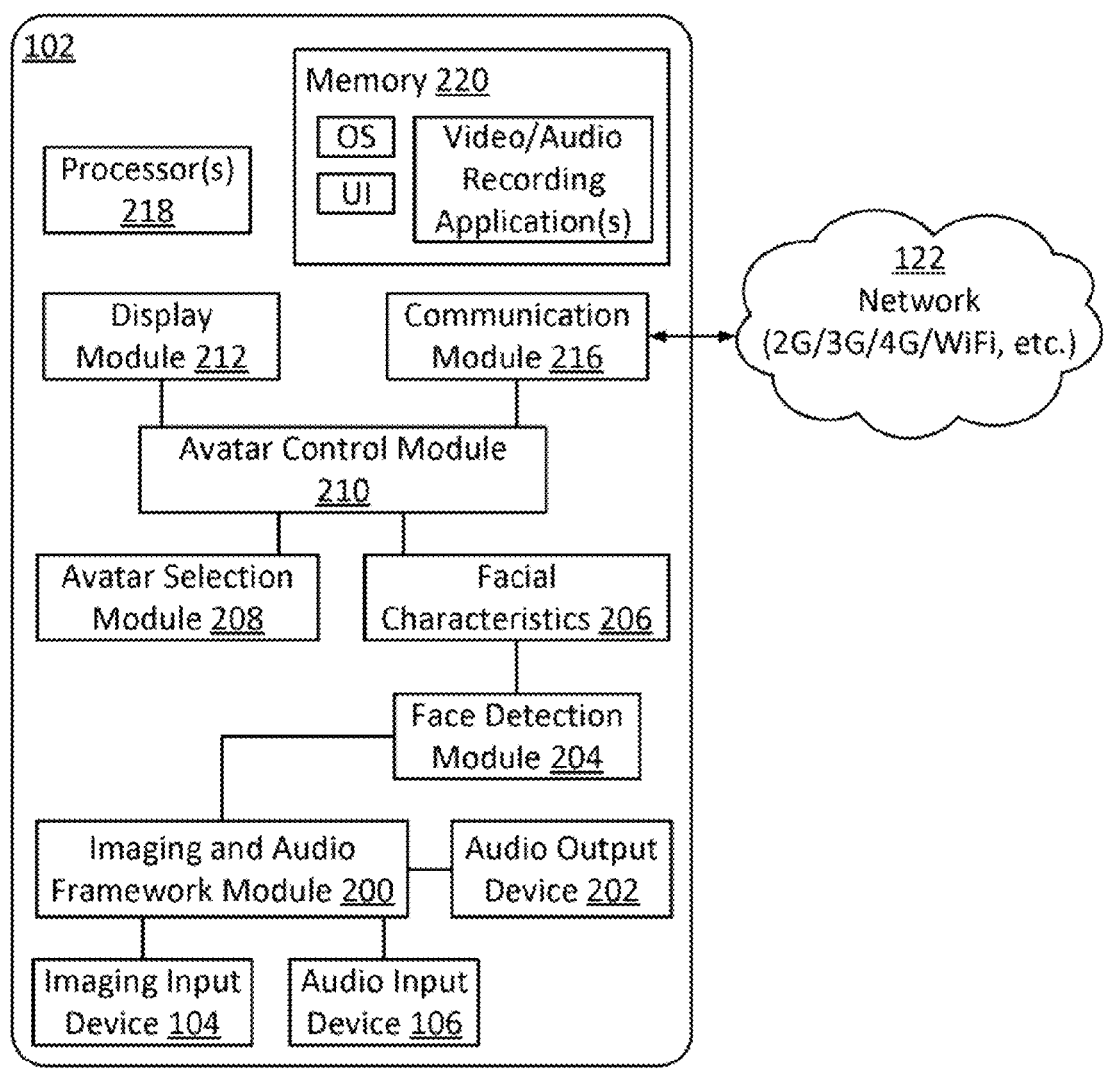
FIG. 1 illustrates a device configured in accordance with an embodiment of the present disclosure.

Techniques are disclosed for performing avatar-based video encoding. In some embodiments, a video recording of an individual may be encoded utilizing an avatar that is driven by the facial expression(s) of the individual. In some such cases, the resultant avatar animation may accurately mimic facial expression(s) of the recorded individual. Some embodiments can be used, for example, in video sharing via social media and networking websites. Some embodiments can be used, for example, in video-based communications (e.g., peer-to-peer video calls; videoconferencing). In some instances, use to the disclosed techniques may help to reduce communications bandwidth use, preserve the individual's anonymity, and/or provide enhanced entertainment value (e.g., amusement) for the individual, for example. Numerous configurations and variations will be apparent in light of this disclosure.

General Overview

As the prevalence of mobile devices and social networking continues to grow, an increasing number of users seek to record and share video with others via their mobile devices, as well as to communicate via video as an alternative to typical phone calls and text-based messages. For example, users may desire to initiate video calls and videoconferencing using their mobile device to transmit audio and real-time video to one or more remote recipients. However, as previously indicated, there are a number of non-trivial issues that can arise which complicate the ability to engage in mobile communications which feature video data. For instance, transmission of substantial amounts of video data consumes large amounts of network bandwidth, for example, for third and fourth generation (3G and 4G) data networks and places a large burden on bandwidth in existing wireless communication infrastructure, which can negatively impact transmission quality. This is particularly true in the case of real-time video transmissions. Another non-trivial issue pertains to the fact that the few existing avatar video applications (e.g., such as WeChat mobile phone text and voice messaging communication service; StarGreetz™ personalized video platform; and Tom's Messenger messaging application) do not allow the avatar to mimic the user's facial expression(s). Instead, the avatar in the video provided by these applications is driven by the user's voice. Other existing applications (e.g., Mojo Masks) merely overlay masks on top of live video and use commodity video codecs to compress the live video with the masks.

Thus, and in accordance with an embodiment of the present disclosure, techniques are disclosed for providing avatar-based encoding of video data. In one example case, the techniques are implemented in a system configured to record video of a user's face and to subsequently reconstruct that original video recording as an avatar-based animation which utilizes an avatar selected to represent the user. During the initial video recording, the facial characteristics of the user are detected and changes therein are tracked, as may result, for example, from changing of the user's facial expression, movement of the user's head, etc. Thereafter, those changes are mapped to the selected avatar on a frame-by-frame basis, and the resultant collection of avatar frames can be encoded with the original audio (if any). The resulting new video is a video animation which accurately mimics or otherwise simulates the facial expressions and head movements produced by the user during the original video recording. In some cases, a hybrid of both actual face and avatar video frames is used in the resulting video. In other cases, only avatar video frames are used. In any such cases, the original audio (if any) can be encoded with the avatar images to provide a new, relatively low-bandwidth video.

As used herein, the term 'avatar' generally refers to the graphical representation of a user in either two-dimensions (2-D) or three-dimensions (3-D). In some cases, a given avatar may resemble the appearance of its user, although this is not necessary, as in some other cases, greater or lesser differences between the user and the avatar may be observed. Thus, while avatars can be lifelike representations, they also can take the form of drawings, cartoons, sketches, etc., which do not necessarily resemble the user's actual appearance.

In some cases, the selected avatar can be one that was generated, for example, from a still image of the user's face that was extracted, for instance, during recording of the original video. However, the present disclosure is not so limited, as in some other cases, the selected avatar can be one that was not so generated, but rather made available for selection by a public, private, or user-generated content database. In some cases, creation and storage of avatars (generated from the user's face or otherwise) can be performed, for example, by an online source or other suitable content provider.

In some instances, an avatar animation generated using the disclosed techniques can be provided, for example, with a fixed background, such that the background image for the avatar is substantially static or non-dynamic in composition and color, so as to simplify encoding and further lower transmission bandwidth needed for sending video over a network. Thus, in some such cases, there exists an opportunity to provide an avatar-encoded video which both accurately simulates the user's emotive communications while containing a lesser amount of imaging/video data, which may result in a much smaller file size as compared, for example, to the original video recording.

As previously indicated, the techniques disclosed herein can be used, for example, to provide a facial-performance-driven avatar which accurately represents the user's actual face and reliably simulates the user's facial expression changes and head movements. In some other instances, the disclosed techniques can be used, for example, to provide a facial-performance-driven avatar which differs from the user's actual face (to a greater or lesser degree, as desired) while still reliably simulating the user's facial expression changes and head movements. In some such cases, this may allow for the user's privacy to be more or less preserved, particularly in the example case in which the avatar is a cartoon character, an animal etc., or other entity which differs from the user's actual appearance. In any case, the ability of a user to select an avatar to represent himself/herself to other users during a given communication session may provide an improved communication/interaction session and thus may help to increase the user's overall satisfaction/enjoyment with that experience. Further note that the avatar-based encoding techniques disclosed herein can be implemented in real time, for example, during online video calls and other such video applications.

Some embodiments may improve video compression significantly (e.g., achieve a higher compression ratio, for example, than would be achievable with live video). For instance, the disclosed techniques can be used to reduce video size by about 1-70% (e.g., in the range of about a 10-20% reduction, about a 20-30% reduction, about a 30-40% reduction, about a 40-50% reduction, about a 50-60% reduction, about a 60-70% reduction, or any other sub-range that is in the range of about 1-70% as compared to the originally recorded video. In some instances, reductions of about 50-70% or greater can be provided. In one example case, a 40-second avatar-based video having VGA resolution and a frame rate of 25 fps produced using the disclosed techniques can be about 1 megabyte in size, whereas the corresponding original face video is 3-5 megabytes in size. As will be apparent in light of this disclosure, greater or lesser improvements in video compression may be provided using the disclosed techniques, as desired for a given target application or end-use. In any case, the improvements in video compression may relate, at least in part, to: (1) use of an avatar which accurately mimics the user's shape change due to facial expressions without the need to capture and convey unnecessary minute facial texture details of the user; and/or (2) use of a fixed background with the avatar and/or actual face frames. As will be appreciated in light of this disclosure, these considerations may aid in reducing bandwidth consumption during a given communication session or other transmission of the video. Some embodiments may permit viewing of an avatar-based representation of a user without having to exchange large amounts of information that otherwise are generally involved with device-to-device communication employing live images.

As will be appreciated in light of this disclosure, and in accordance with some embodiments, an avatar-based animation video produced using the disclosed techniques can be shared with others using any of a wide variety of platforms or delivery services. For instance, in some cases, an avatar-based animation provided as described herein can be shared or otherwise disseminated, for example, using: instant messaging (IM); social media or networking tools, such as YouTube, Facebook, LinkedIn, Yahoo, Google+, MSN, Weibo, etc.; or other text/voice communication services, such as WeChat/Weixin, etc. Some embodiments may provide enhanced or otherwise light-hearted entertainment value (e.g., use of an avatar can be fun and amusing) or an otherwise enhanced user experience.

It should be noted that while the disclosed techniques generally are discussed in the example context of mobile computing devices, the present disclosure is not so limited. For instance, in some cases, the disclosed techniques can be used, for example, with non-mobile computing devices (e.g., a desktop computer, a videoconferencing system, etc.), in accordance with some embodiments. Also, it should be noted that while the disclosed techniques are generally discussed in the example context of video creation, they also can be used, for example, in video-based collaborative contexts, such as peer-to-peer or multi-point video conferencing, virtual classrooms, or any other context in which peer-to-peer video-based communication can be used, in accordance with some embodiments. In some example cases, each peer involved in such a video-based collaborative context can share and/or receive (e.g., in real time) avatar-based videos provided as described herein. In some other example cases, some peers involved in such a video-based collaborative context can share and/or receive live video while other peers share and/or receive avatar-based videos. Numerous suitable uses will be apparent in light of this disclosure.

As will be further appreciated, various embodiments can be implemented, for example, in software, firmware, hardware, and/or a combination thereof. In some cases, and in accordance with an embodiment, avatar-based video encoding using the disclosed techniques can be offered, for example, as a commodity service. Also, and in accordance with an embodiment, use of the disclosed techniques may be detected, for example, by visual observation of an avatar-based video which uses a facial-performance-driven avatar.

Some embodiments of the present disclosure can be implemented, for example, using the human face encoding scheme, for example, in MPEG-4 standards (MPEG Video, Information technology—Coding of audio-visual objects—Part 2: Visual, Amendment 1: Visual extensions, ISO/IEC JTC1/SC29/WG11/N3056, January, 2000). In such cases, the static face shape can be described, for instance, by Facial Definition Parameters (FDP), and the dynamic face change can be described, for instance, by Facial Animation Parameters (FAP). However, it should be noted that MPEG-4 is oriented to natural face image encoding, whereas some embodiments described herein target both realistic face-style avatar and cartoon-style avatar encoding. As will be appreciated in light of this disclosure, when portrayal of the user's real face is replaced with portrayal of an avatar in the center of an image, the information entropy can be greatly reduced and significantly fewer bits required for encoding, in accordance with some embodiments. In addition, some embodiments may work in an interactive manner such that the user can select from different avatar models (characters, animals, etc.) and rendering style (sketch, mask, 2-D/3-D cartoon, human-realistic) to reconstruct the original face video. As will be further appreciated, these example features can contribute, in some instances, to the enjoyment experienced by the user, for example, in peer-to-peer messaging and social media and networking contexts.

System Architecture

FIG. 1 illustrates a device 102 configured in accordance with an embodiment of the present disclosure. As can be seen, device 102 includes an imaging input device 104 and an audio input device 106 (discussed below) and can be configured, for example, to communicate with a network 122. In accordance with some embodiments, device 102 may be or otherwise include any of a variety of hardware platforms that are capable of wired and/or wireless communication. For example, device 102 may be or otherwise include: a laptop/notebook computer; a tablet computer; a mobile phone or smartphone (e.g., iPhone®, Android®-based phone. Blackberry®, Symbian®-based phone, Palm®-based phone, etc.); a personal digital assistant (PDA); a cellular handset; a handheld gaming device; a gaming platform; a desktop computer; and/or a videoconferencing system. In a more general sense, and in accordance with some embodiments, device 102 can be any computing device, mobile or otherwise, capable of communication over a wired and/or wireless connection, as will be apparent in light of this disclosure.

Network 122 can be any suitable communications network, as will be apparent in light of this disclosure. For instance, network 122 may be a public and/or private network, such as a private local area network (LAN) operatively coupled to a wide area network (WAN) such as the Internet. In some instances, network 122 can include various second-generation (2G), third-generation (3G), fourth-generation (4G) mobile communication technologies, a wireless local area network (WLAN) (e.g., Wi-Fi® wireless data communication technologies), etc. In some cases, network 122 may include supporting infrastructure and/or functionalities such as a server and a service provider, but such features are not necessary to carry out communication via network 122.

In accordance with an embodiment, imaging input device 104 can be any device for capturing digital images representative of an environment that includes one or more persons and may have adequate resolution for face analysis of the one or more persons in the environment, as described herein. For example, imaging input device 104 may be a still camera (e.g., a camera configured to capture still photographs) or a video camera (e.g., a camera configured to capture moving images comprising a plurality of frames). In some cases, imaging input device 104 may include components such as, but not limited to, an optics assembly, an image sensor, and an image/video encoder. These components (and others, if any) of imaging input device 104 may be implemented in any combination of hardware and/or software.

Imaging input device 104 can be configured to operate using light, for example, in the visible spectrum or with other portions of the electromagnetic spectrum not limited to the infrared (IR) spectrum, ultraviolet (UV) spectrum, etc. Imaging input device 104 may be incorporated within device 102 or may be a separate device configured to communicate with device 102 via wired and/or wireless communication. Some examples of imaging input device 104 may include: web cameras as may be associated with computers, video monitors, etc.; mobile device cameras (e.g., cell phone or smartphone cameras integrated in, for example, the previously discussed example device); integrated laptop computer cameras; and integrated tablet computer cameras (e.g., iPad®, Galaxy Tab®, and the like). In any case, imaging input device 104 may be configured for wired (e.g., Universal Serial Bus or USB, Ethernet, FireWire, etc.) and/or wireless (e.g., Wi-Fi®, Bluetooth®, etc.) communications. Other suitable types and configurations for imaging input device 104 will depend on a given application and will be apparent in light of this disclosure.

In accordance with an embodiment, audio input device 106 can be, for example, a microphone or any other device for sensing/recording sound. Audio input device 106 can be used, for example, in recording the user's voice or other local sounds, as desired. Audio input device 106 may be integrated with device 102 or may interact with device 102 via wired and/or wireless communication, such as described in the above examples regarding imaging input device 104. Other suitable types and configurations for audio input device 106 will depend on a given application and will be apparent in light of this disclosure.

As can be seen, device 102 also includes an imaging and audio framework module 200 which receives input from imaging input device 104 and/or audio input device 106, discussed above. The imaging and audio framework module 200 may include custom, proprietary, known, and/or after-developed audio and video processing code (or instruction sets) that are generally well-defined and operable to control at least imaging input device 104 and/or audio input device 106. For example, the imaging and audio framework module 200 may be configured: (1) to cause imaging input device 104 to capture/record images or video; and/or (2) to cause audio input device 106 to sense/record sounds. Also, in some cases, imaging and audio framework module 200 may be configured to process any such captured images/video and recorded sounds. Furthermore, imaging and audio framework module 200 may be configured to reproduce: (1) images on a display (e.g., of device 102 or other display device); and/or (2) sounds from audio output device 202 (discussed below). The imaging and audio framework module 200 may vary depending on device 102 and, more particularly, the operating system (OS) running on device 102. Some example operating systems include iOS®, Android®, Blackberry® OS, Symbian®, and Palm® OS. Other suitable configurations and capabilities for imaging and audio framework module 200 will depend on a given application and will be apparent in light of this disclosure.

Device 102 also may include an audio output device 202. Audio output device 202 can be a loudspeaker or other device capable of producing sound. As previously noted, audio output device 202 may receive audio information from imaging and audio framework module 200 and may be configured to reproduce local sounds (e.g., to provide audio feedback of a user's voice) and remote sounds (e.g., the sound of other parties engaged in communication with device 102). In some cases, audio output device 202 may be incorporated within or otherwise integrated with device 102, while in some other cases, it may be a separate device configured to communicate with device 102, for example, using any of the example wired and/or wireless communications noted above with respect to imaging input device 104. Other suitable types and configurations for audio output device 202 will depend on a given application and will be apparent in light of this disclosure.

Device 102 further may include a face detection module 204 configured, for example, to identify and track a head, face, and/or facial region within image(s) provided by imaging input device 104 and to determine one or more facial characteristics of the user (e.g., facial characteristics 206, discussed below). For example, the face detection module 204 may include custom, proprietary, known, and/or after-developed face detection code (or instruction sets), hardware, and/or firmware that are generally well-defined and operable to receive a standard format image (e.g., an RGB color image) and to identify, at least to a certain extent, a face within the image. Face detection module 204 also may be configured to track the detected face through a series of images (e.g., video frames at a given frame rate, such as 24 frames/second) and to determine a head position based on the detected face, as well as changes in facial characteristics of the user (e.g., facial characteristics 206). Some example suitable tracking systems that may be employed by face detection module 204 include particle filtering, mean shift, and/or Kalman filtering, each of which may utilize analytical techniques such as edge analysis, sum-of-square-difference analysis, feature point analysis, histogram analysis, skin tone analysis, etc.

Also, face detection module 204 may include custom, proprietary, known, and/or after-developed facial characteristics code (or instruction sets) that are generally well-defined and operable to receive a standard format image (e.g., an RGB color image) and to identify, at least to a certain extent, one or more facial characteristics in the image. Some example suitable facial characteristics systems include the Colorado State University (CSU) Face Identification Evaluation System and/or standard Viola-Jones boosting cascade framework, which may be found in the public Open Source Computer Vision (OpenCV™) package.

As discussed in greater detail herein, facial characteristics 206 may include features of the face, including, but not limited to, the location and/or shape of facial landmarks such as eyes, nose, mouth, facial contour, etc., as well as movement of such landmarks. In one embodiment, avatar animation may be based on sensed facial actions (e.g., changes in facial characteristics 206). The corresponding feature points on an avatar's face may follow or mimic the movements of the real person's face, which is known as "expression clone" or "performance-driven facial animation."

Face detection module 204 also may be configured to recognize an expression associated with the detected features (e.g., identifying whether a previously detected face is happy, sad, smiling, frowning, surprised, excited, etc.). To that end, face detection module 204 further may include custom, proprietary, known, and/or after-developed facial expression detection and/or identification code (or instruction sets) that are generally well-defined and operable to detect and/or identify expressions in a face. For example, face detection module 204 may determine size and/or position of facial features (e.g., eyes, nose, mouth, etc.) and may compare these facial features to a facial feature database which includes a plurality of sample facial features with corresponding facial feature classifications (e.g., smiling, frowning, excited, sad, etc.).

Device 102 further may include an avatar selection module 208 configured to allow selection (e.g., by the user) of an avatar for use during the communication session. The avatar selection module 208 may include custom, proprietary, known, and/or after-developed user interface (UI) construction code (or instruction sets) that are generally well-defined and operable to present different avatars for selection. In some embodiments, avatar selection module 208 may be configured to allow: (1) selection from one or more avatars stored within device 102; (2) selection from one or more avatars hosted by a database (e.g., avatar database 500), discussed below) or other content provider accessible by device 102 through wired and/or wireless communication; and/or (3) generation of an avatar based on detected facial characteristics 206 of the user (e.g., from a front-face picture of the user). In some instances, a generated avatar may be stored within device 102 for use during future communications. In some cases, avatars may be selected prior to establishing communication, but the present disclosure is not so limited, as in some other cases, avatar selection may be performed and/or changed during the course of a communication.

Device 102 further may include an avatar control module 210 configured to generate an avatar in response to selection input from avatar selection module 208. Avatar control module 210 may include custom, proprietary, known, and/or after-developed avatar generation processing code (or instruction sets) that are generally well-defined and operable to generate an avatar based on the user's face/head position and/or facial characteristics 206 detected by face detection module 208. The avatar control module 210 further may be configured to generate parameters for animating an avatar. Animation, as referred to herein, may be defined as altering the appearance of an image/model. A single animation may alter the appearance of a still image, or multiple animations may occur in sequence to simulate motion in the image (e.g., head turn, nodding, talking, frowning, smiling, laughing, etc.). A change in position of the detected face and/or a facial characteristic 206 may be converted into parameters that cause the avatar's features to resemble the features of the user's face.

In some embodiments, the general expression of the detected face may be converted into one or more parameters that cause the avatar to exhibit the same expression. The expression of the avatar also may be exaggerated to emphasize the expression, in some instances. Knowledge of the selected avatar may not be necessary when avatar parameters may be applied generally to all of the predefined avatars. However, in one embodiment, avatar parameters may be specific to the selected avatar, and thus, may be altered if another avatar is selected. For example, human avatars may require parameter settings (e.g., different avatar features may be altered) to demonstrate emotions like happiness, sadness, anger, surprise, etc., which are different from those for animal avatars, cartoon avatars, etc.

Avatar control module 210 may include custom, proprietary, known, and/or after-developed graphics processing code (or instruction sets) that are generally well-defined and operable to generate parameters for animating the avatar selected by avatar selection module 208 based on the face/head position and/or facial characteristics 206 detected by face detection module 204. For facial feature-based animation methods, avatar animation may be done, for example, using image warping or image morphing. In accordance with some example embodiments, Oddcast™ technologies available from Oddcast, Inc. is an example of a software resource usable for two-dimensional (2-D) avatar animation. Also, and in accordance with some example embodiments, Maya™ 3D animation software from Autodesk, Inc. and Blender™ 3D animation suite provided by www.blender.org are examples of software resources usable for three-dimensional (3-D) avatar animation. Other suitable 2-D and 3-D animation software resources will depend on a given application and will be apparent in light of this disclosure.

The avatar control module 210 may cause a display module 212 to display an avatar on a display of device 102 or otherwise operatively coupled with device 102. Display module 212 may include custom, proprietary, known, and/or after-developed graphics processing code (or instruction sets) that are generally well-defined and operable to display and animate an avatar on a display. For example, avatar control module 210 may receive an avatar selection and may interpret that selection to correspond to a predetermined avatar. The display module then may display the avatar, for example, on a display of device 102.

Device 102 also may include a communication module 216 configured to transmit and receive information for selecting avatars, displaying avatars, animating avatars, etc. Communication module 216 may include custom, proprietary, known and/or after-developed communication processing code (or instruction sets) that are generally well-defined and operable to transmit avatar selections and avatar parameters and to receive data. Communication module 216 also may be configured to transmit and receive audio information corresponding to avatar-based communications. Communication module 216 may transmit and receive the above information, for example, via a network 122, as previously described. In some cases, communication module 216 may permit wired and/or wireless communication, for example, with one or more remote devices (e.g., with one or more other devices 102).

Device 102 further may include one or more processors 218 configured to perform operations associated with device 102 and one or more of the modules included therein. Also, device 102 may include memory 220 for processor workspace and storage. Memory 220 can be of any suitable type (e.g., RAM and/or ROM, or other suitable memory) and of any suitable size, and in some cases may be implemented with volatile memory, non-volatile memory, or a combination thereof. Memory 220 may be utilized, for example, to store media, programs, applications, content, etc., on device 102 on a temporary or permanent basis.

Memory 220 can include a number of modules stored therein that can be accessed and executed, for example, by the processor(s) 218. For instance, device 102 may include an operating system (OS) module, for example, to aid in processing input received from imaging input device 104 and/or audio input device 106. The OS module can be implemented with any suitable OS, mobile or otherwise (e.g., Android® OS from Google, Inc.; iOS® from Apple, Inc.: Windows Phone® OS from Microsoft Corp.; etc.), as will be apparent in light of this disclosure. Also, device 102 may include a user interface (UI) module, for example, to aid in carrying out avatar-based video encoding, as variously described herein. Furthermore, device 102 may include or otherwise have access to: (1) a video recording application or other software which permits video recording and extraction of images therefrom, as variously described herein; and/or (2) an audio recording application or other software which permits audio recording, as variously described herein. In some instances, the video and/or audio recording application(s) may be stored in memory 220. Other suitable modules for memory 220 will depend on a given application and will be apparent in light of this disclosure.

In any case, the modules of memory 220 can be implemented, for example, in any suitable programming language (e.g., C, C++, objective C, JavaScript, custom or proprietary instruction sets, etc.), and encoded on a machine-readable medium that, when executed by the processor, carries out the functionality of the device. The computer-readable medium may be, for example, a hard drive, compact disk, memory stick, server, or any suitable non-transitory computer/computing device memory that includes executable instructions, or a plurality or combination of such memories. Other embodiments can be implemented, for instance, with gate-level logic or an application-specific integrated circuit (ASIC) or chip set or other such purpose-built logic, or a microcontroller having input/output capability (e.g., inputs for receiving user inputs and outputs for directing other components) and a number of embedded routines for carrying out the device functionality. In short, the functional modules can be implemented in hardware, software, firmware, or a combination thereof.

Figure 2:
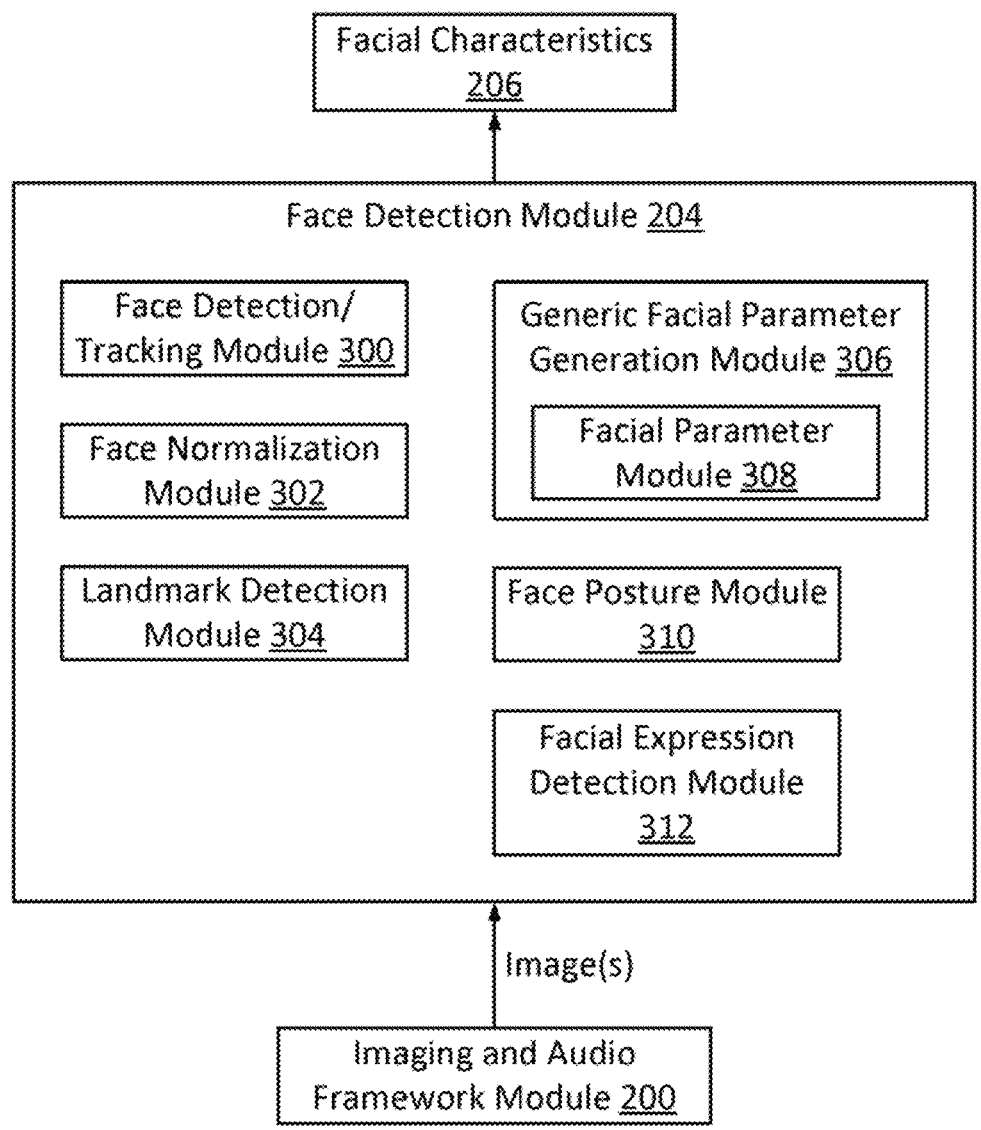
FIG. 2 illustrates an example face detection module configured in accordance with an embodiment of the present disclosure.

FIG. 2 illustrates an example face detection module 204 configured in accordance with an embodiment of the present disclosure. Face detection module 204 may be configured to receive one or more images from imaging input device 104 via the imaging and audio framework module 200 and to identify, at least to a certain extent, a face (or optionally multiple faces) in the received image(s). Face detection module 204 also may be configured to identify and determine, at least to a certain extent, one or more facial characteristics 206 in the image. Facial characteristics 206 may be generated based on one or more of the facial parameters identified by face detection module 204, as described herein. Facial characteristics 206 may include features of the face, such as, but not limited to, the location and/or shape of facial landmarks such as eyes, nose, mouth, facial contour, eyebrows, etc.

In the illustrated example embodiment, face detection module 204 includes a face detection/tracking module 300, a face normalization module 302, a landmark detection module 304, a generic facial parameter generation module 306, a facial parameter module 308, a face posture module 310, and a facial expression detection module 312. The face detection/tracking module 300 may include custom, proprietary, known, and/or after-developed face tracking code (or instruction sets) that is generally well-defined and operable to detect and identify, at least to a certain extent, the size and location of human faces in a still image or video stream received from imaging input device 104. Some example suitable face detection/tracking systems include, for example, the techniques of Viola and Jones, published as Paul Viola and Michael Jones, *Rapid Object Detection using a Boosted Cascade of Simple Features*, Accepted Conference on Computer Vision and Pattern Recognition, 2001. These techniques use a cascade of Adaptive Boosting (AdaBoost) classifiers to detect a face by scanning a window exhaustively over an image. The face detection/tracking module 300 also may track a face or facial region across multiple images.

Face normalization module 302 may include custom, proprietary, known, and/or after-developed face normalization code (or instruction sets) that is generally well-defined and operable to normalize the identified face in the image. For example, face normalization module 302 may be configured to rotate the image to align the eyes (if the coordinates of the eyes are known), nose, mouth, etc., and crop the image to a smaller size generally corresponding to the size of the face, scale the image to make the distance between the eyes, nose and/or mouth, etc., constant, apply a mask that zeros out pixels not in an oval that contains a typical face, histogram equalize the image to smooth the distribution of gray values for the non-masked pixels, and/or normalize the image so the non-masked pixels have mean zero and standard deviation one.

Landmark detection module 304 may include custom, proprietary, known, and/or after-developed landmark detection code (or instruction sets) that are generally well-defined and operable to detect and identify, at least to a certain extent, the various facial features of the face in the image.

Implicit in landmark detection is that the face already has been detected, at least to some extent. Optionally, some degree of localization may have been performed (e.g., by face normalization module 302) to identify/focus on the zones/areas of the image where landmarks potentially may be found. For example, landmark detection module 304 may be based on heuristic analysis and may be configured to identify and/or analyze the relative position, size, and/or shape of the forehead, eyes (and/or the corner of the eyes), nose (e.g., the tip of the nose), chin (e.g., tip of the chin), eyebrows, cheekbones, jaw, and/or facial contour. The eye-corners and mouth corners also may be detected, for example, using Viola-Jones-based classifiers.

Generic facial parameter generation module 306 may include custom, proprietary, known, and/or after-developed facial pattern code (or instruction sets) that is generally well-defined and operable to identify and/or generate a facial pattern based on the identified facial landmarks in the image. As will be appreciated in light of this disclosure, module 306 may be considered a portion of face detection/tracking module 300, in some instances. Also, module 306 may include a facial parameter module 308 configured to generate facial parameters of the user's face based, at least in part, on the identified facial landmarks in the image. Facial parameter module 308 may include custom, proprietary, known, and/or after-developed facial pattern and parameter code (or instruction sets) that are generally well-defined and operable to identify and/or generate key points and associated edges connecting at least some of the key points based on the identified facial landmarks in the image. As described in detail herein, the generation of an avatar by avatar control module 210 may be based, at least in part, on the facial parameters generated by facial parameter module 308, including the key points and associated connecting edges defined between the key points. Similarly, animation and rendering of a selected avatar, including both the predefined avatars and generated avatars, by avatar control module 210 may be based, at least in part, on the facial parameters generated by facial parameter module 308.

Face posture module 310 may include custom, proprietary, known, and/or after-developed facial orientation detection code (or instruction sets) that are generally well-defined and operable to detect and identify, at least to a certain extent, the posture of the face in the image. For example, face posture module 310 may be configured to establish the posture of the face in the image with respect to device 102. More specifically, face posture module 310 may be configured to determine whether a user's face is directed toward the imaging input device 104 of the device 102.

Facial expression detection module 312 may include custom, proprietary, known, and/or after-developed facial expression detection and/or identification code (or instruction sets) that are generally well-defined and operable to detect and/or identify facial expressions of the user in the image. For example, facial expression detection module 312 may determine the size and/or position of various facial features (e.g., forehead, chin, eyes, nose, mouth, cheeks, facial contour, etc.) and compare the facial features to a facial feature database which includes a plurality of sample facial features with corresponding facial feature classifications.

FIGS. 3A-3E illustrate example facial control parameters and generation of an avatar animation in accordance with an embodiment of the present disclosure. As shown in FIG. 3A, an image 400 (e.g., a front-face picture) of a user serves as a starting point for avatar generation. As previously described, face detection module 204 (including the face detection/tracking module 300, a face normalization module 302, and/or landmark detection module 304, etc.) may be configured to detect and identify the size and location of the user's face, normalize the identified face, and/or detect and identify, at least to a certain extent, the various facial features of the face in the image 400. More specifically, the relative position, size, and/or shape of the forehead, eyes and/or the corner of the eyes, nose (e.g., the tip of the nose), chin (e.g., the tip of the chin), eyebrows, cheekbones, jaw, and facial contour may be identified and/or analyzed.

As shown in FIG. 3B, the facial pattern, including facial parameters, of the user's face may be identified in the image 402. More specifically, the facial parameter module 308 may be configured to generate facial parameters of the user's face based, at least in part, on the identified facial landmarks in the image 402. As shown, the facial parameters may include one or more key points 404 and associated edges 406 connecting one or more key points 404 to one another. The key points 404 and associated edges 406 form an overall facial pattern of a user based on the identified facial landmarks.

In some example embodiments, facial parameter module 308 may include custom, proprietary, known, and/or after-developed facial parameter code (or instruction sets) that are generally well-defined and operable to generate the key points 404 and connecting edges 406 based on the identified facial landmarks (e.g., forehead, eyes, nose, mouth, chin, facial contour, etc.) according to statistical geometrical relation between one identified facial landmark, such as, for example, the forehead, and at least one other identified facial landmark, such as, for example, the eyes.

For instance, in one embodiment, the key points 404 and associated edges 406 may be defined in a two-dimensional Cartesian coordinate system. More specifically, a key point 404 may be defined (e.g., coded) as {point, id, x, y}, where "point" represents node name, "id" represents index, and "x" and "y" are coordinates. An edge 406 may be defined (e.g., coded) as {edge, id, n, p1, p2, . . . , pn}, where "edge" represents node name, "id" represents edge index, "n" represents the number of key points contained (e.g., connected) by the edge 406, and p1-pn represent a point index of the edge 406. For example, the code set {edge, 0, 5, 0, 2, 1, 3, 0} may be understood to represent edge-0 includes (connects) 5 key points, wherein the connecting order of key points is key point 0 to key point 2 to key point 1 to key point 3 to key point 0.

After key points 404 and associated edges 406 are established, in some embodiments, a three-dimensional (3-D) avatar of the detected face is constructed. Each point or vertex of a three-dimensional (3-D) facial model may be represented in terms of shape data (e.g., x, y, z in terms of Cartesian coordinates) and texture data (e.g., red, green, and blue color in 8-bit depth). In accordance with some embodiments, a model face has face shape and texture data in the form of one or more Principal Component Analysis (PCA) coefficients. A morphable face model is derived by transforming shape and/or texture data into a vector space representation, and then the morphable face model is manipulated to provide a three-dimensional avatar. This transformation and manipulation may be performed by an avatar generation module on device 102. Alternatively, data describing key points 404 and associated edges 406 may be uploaded to a server for transformation to a two-dimensional (2-D) or three-dimensional (3-D) avatar.

To build a vector space representation to serve as a three-dimensional (3-D) avatar model, motion vectors associated with key points 404 (e.g., eye corners, nose-tip, and mouth corners, etc.) of the face can be used. These motion vectors associated with key points 404 may be obtained prior to model construction in a motion capture procedure and stored in a database to be queried during avatar construction and animation. Alternatively, motion vectors may be obtained by tracking the user's facial expressions over time in a "training session" prior to model construction. Beginning with the motion vectors for key points 404, other motion vectors for other points in the three-dimensional (3-D) avatar may be derived by interpolation.

In one example embodiment, a standard three-dimensional (3-D) morphable face model tool, such as FaceGen™ available from Singular Inversions at www.facegen.com, is used to fit a three-dimensional (3-D) morphable face model to the input two-dimensional (2-D) face image. An example initial three-dimensional (3-D) morphable face model is shown in FIG. 3C. Generally, a three-dimensional (3-D) face model is represented as an array of vertices V and triangles T. Each vertex is a three-dimensional point with (x,y,z) coordinates; and T includes the triangular faces that connect these vertices. Shown in FIG. 3C is a simple face model, for example, with 45 vertices and 72 triangles. In this example embodiment, the connecting triangles are fixed and not changed. The shape of the face model is changed by changing the positions of the vertices V. If a face model has N vertices, the vertex array is a 3N×1 vector: M={x1, y1, z1, x2, y2, z2, . . . , xn, yn, zn}$^T$ (a column vector).

Input data having the same topology (same number of vertices and the same connection triangles) can be provided via the morphable model tool to train a morphable model through PCA (Principle Component Analysis) representation, as described below. A three-dimensional (3-D) morphable face model M is constructed in accordance with a formula:

$$M = M_0 + \sum_{i=1}^{k} P_i * b_i$$

where $M_0$ is the average morphable model derived from an average of all data points, $P_i$ are eigenvectors (each $P_i$ is a 3N×1 column vector), and $b_i$ (called PCA coefficients) are eigenvalues. For a specific face model, $M_0$ and P are fixed, but b is adjustable. One model corresponds to an array of PCA coefficients; that is, given a three-dimensional (3-D) face model, matrix factorization can be used to obtain corresponding PCA coefficients $b_i$; and vice versa, given an array of PCA coefficients $b_i$, a three-dimensional face model can be derived.

The detected key points 404 and edges 406 derived as described with reference to FIG. 3B are feature points of a face model, describing a shape of a face. Their position (three-dimensional coordinates) can be used to measure error in fitting the three-dimensional (3-D) morphable face model to the two-dimensional (2-D) input image. $M_0$ and P may be obtained from the morphable model tool and/or from a motion capture training procedure performed prior to model construction and stored in a model database. Adjusting $b_i$, the PCA coefficients, in the formula will result in a different three-dimensional (3-D) model M. Initially, the values of $b_i$ are set to zero, and then M=$M_0$ is calculated as the average three-dimensional face based upon an average of all data points. The resulting three-dimensional (3-D) model M is projected into the two-dimensional (2-D) image plane. This projection provides the projected position of key points 404 and edges 406 on the three-dimensional (3-D) face model.

Errors are calculated as differences between the projected key points and the detected key points 404. The calculation is then performed iteratively by repeatedly adjusting b (the PCA coefficients) to produce a new three-dimensional (3-D) model. The new three-dimensional (3-D) model is projected onto the two-dimensional (2-D) image, error is calculated again, and the procedure is repeated until the amount of error reaches an acceptable minimum value. When the amount of error reaches the acceptable minimum value, generation of the three-dimensional (3-D) avatar is complete. This technique is described in more detail by Volker Blanz, et al., in "A Statistical Method for Robust 3D Surface Reconstruction from Sparse Data," Int. Symp. on 3D Data Processing, Visualization and Transmission, 2004.

FIGS. 3D and 3E illustrate an example two-dimensional (2-D) avatar 408a and an example three-dimensional (3-D) avatar 408b, respectively, generated based on the identified facial landmarks and facial parameters, including the key points 404 and edges 406. As can be seen, avatars 408a and/or 408b provide a more or less accurate representation of the user's real face depicted in image 400.

Figure 4:
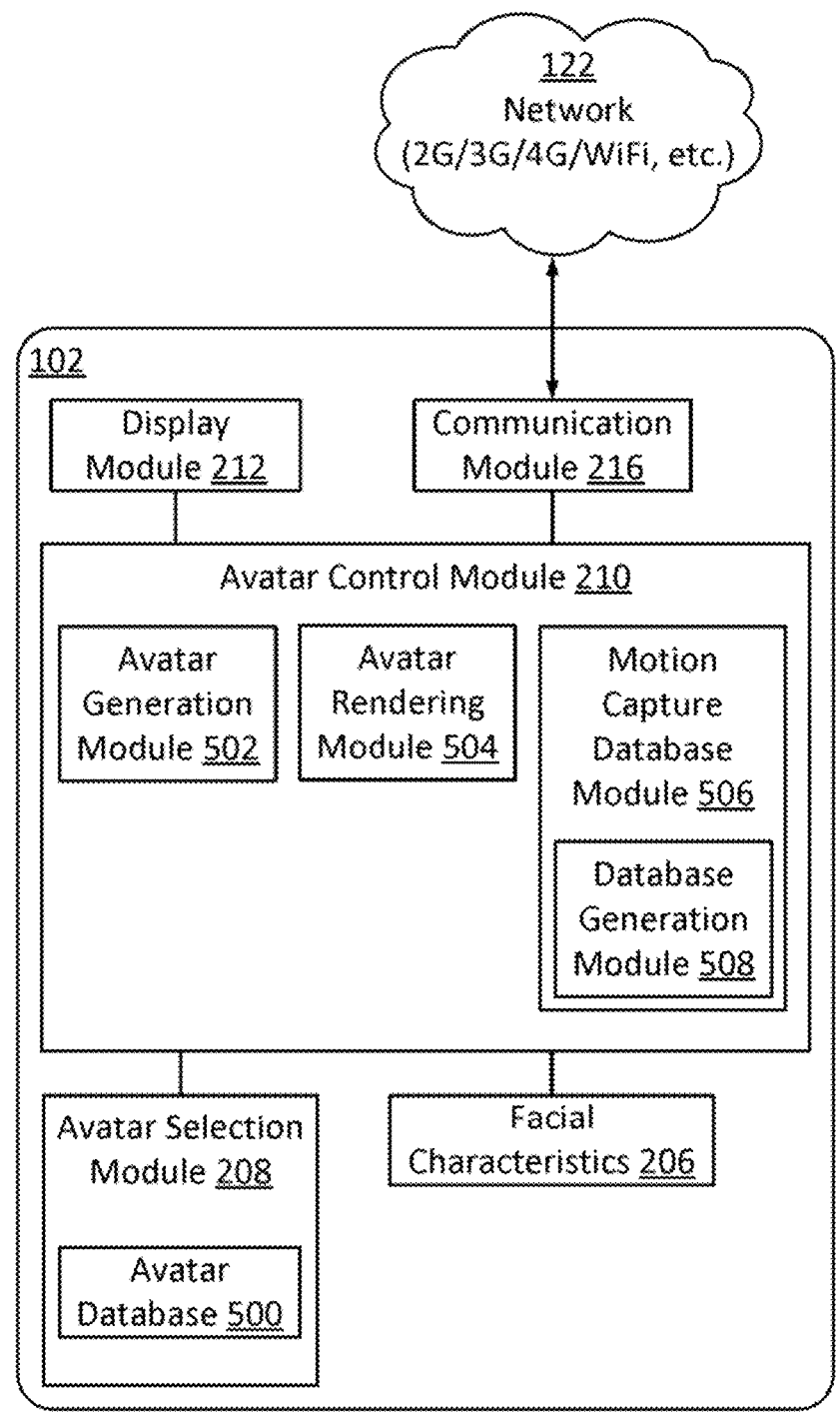
FIG. 4 illustrates an example avatar control module and avatar selection module, configured in accordance with an embodiment of the present disclosure.

FIG. 4 illustrates an example avatar control module 210 and avatar selection module 208, configured in accordance with an embodiment of the present disclosure. Avatar selection module 208 may be configured to allow a user of device 102 to select an avatar for use in reconstructing a video recording, as variously described herein. Avatar selection module 208 may include custom, proprietary, known, and/or after-developed user interface construction code (or instruction sets) that are generally well-defined and operable to present one or more avatars for selection (e.g., present a given avatar to a user so that the user may select one of the avatars). In some cases, avatar selection module 208 may be configured to allow a user of the device 102 to select one or more predefined avatars stored within an avatar database 500. While avatar database 500 is depicted in FIG. 4 as being stored within avatar selection module 208 on device 102, it is contemplated that avatar database 500 alternatively may be stored on or otherwise accessible through a network 122 associated with device 102. Avatar selection module 208 may be further configured to allow a user to select to have an avatar generated, as generally shown and described, for example, with reference to FIGS. 3A-3E. An avatar that has been generated may be referred to as generated avatar, wherein the key points and edges are generated from an image of a user's face, as opposed to having predefined key points. In contrast, a predefined avatar may be referred to as a model-based avatar, wherein the key points are predefined and the predefined avatar is not customized to the particular user's face.

As shown, avatar control module 210 may include an avatar generation module 502 configured to generate an avatar, for example, in response to user selection indicating generation of an avatar from the avatar selection module 208. Avatar generation module 502 may include custom, proprietary, known, and/or after-developed avatar generation processing code (or instruction sets) that are generally well-defined and operable to generate an avatar based on the facial characteristics 206 detected by face detection module 204. More specifically, avatar generation module 502 may generate avatars 408a and/or 408b (e.g., such as those discussed in the context of FIGS. 3D and 3E, respectively) based on the identified facial landmarks and facial parameters, including the key points 404 and edges 406. Upon generation of the avatar, avatar control module 210 may be further configured to transmit a copy of the generated avatar to avatar selection module 208 to be stored in the avatar database 500.

Avatar control module 210 also may include an avatar rendering module 504 configured, for example, to provide adaptive rendering of an avatar selection based on avatar parameters. More specifically, the avatar control module 210 may include custom, proprietary, known, and/or after-developed graphics processing code (or instruction sets) that are generally well-defined and operable to adaptively render the selected avatar so as to appropriately fit on a display operatively coupled with device 102 and prevent distortion of the avatar when displayed to a user.

Methodology

Figure 5:
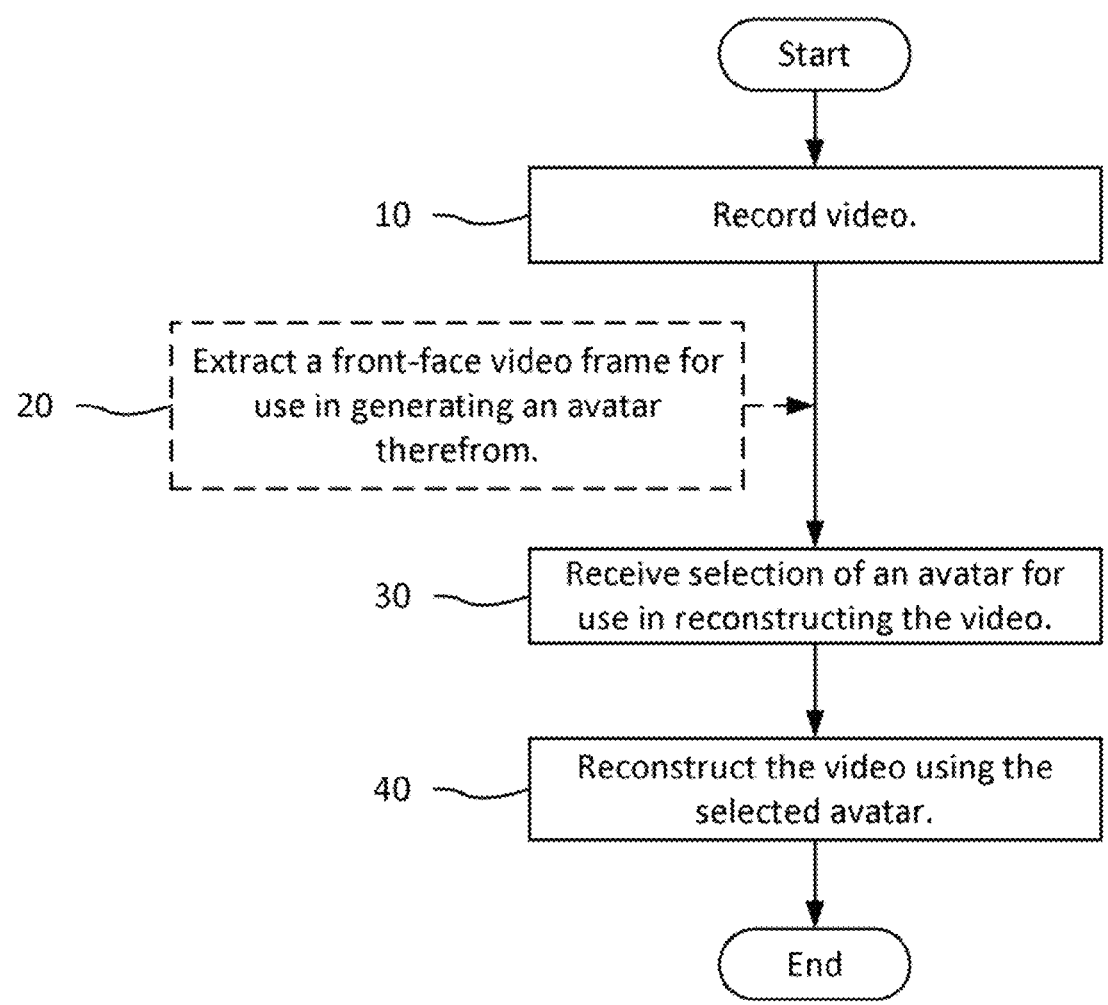
FIG. 5 illustrates a process of avatar-based video encoding, in accordance with an embodiment of the present disclosure.

FIG. 5 illustrates a process of avatar-based video encoding, in accordance with an embodiment of the present disclosure. As can be seen, the process may begin as in block 10 with recording a video. As discussed above, this can be done, for example, by activating a video recording application or other suitable software associated with device 102 (e.g., at memory 220) which causes imaging input device 104 to capture imaging data and/or causes audio input device 106 to capture audio data. In some cases, activation can occur based on user input. In some other cases, activation can be triggered by a sensor (e.g., an always-on video sensor) or other suitable device. In any such cases, as will be appreciated in light of this disclosure, the captured imaging data can be provided, for example, in the form of a sequence of images or frames (e.g., video frames).

In some cases, a video frame capturing the user's face (e.g., a front-face video frame) optionally can be extracted from the video recording, as in block 20. In some instances, such extraction may occur while the video is being recorded. In some other instances, extraction may occur after video recording has been completed. In any case, and in accordance with some embodiments, the optionally extracted front-face video frame image can be used to generate a two-dimensional (2-D) or three-dimensional (3-D) avatar, as discussed above, for example, with reference to FIGS. 3A-3E. In some cases, and in accordance with an embodiment, an avatar may be generated using the techniques described in PCT Application No. PCT/CN2012/081061, filed on Sep. 6, 2012, and titled "System and Method for Avatar Creation and Synchronization." In more detail, generation of an avatar from the front-face still frame extracted from the video can be performed locally at device 102 (e.g., by avatar generation module 502) and/or remotely (e.g., by uploading the front-face image, key points 404, and edges 406 to network 122 and using an avatar generation software or service made available thereby). Also, an avatar generated from the user's face may be stored, for example, in an avatar database 500 hosted: (1) locally on device 102 (e.g., within avatar selection module 208); and/or (2) remotely (e.g., within network 122 or other remote database accessible by device 102).

The process may continue as in block 30 with selecting an avatar for use in reconstructing the video. Selection may be made from a group of one or more avatars available, for example, in an avatar database 500 hosted: (1) locally on device 102 (e.g., within avatar selection module 208); and/or (2) remotely (e.g., within network 122 or other remote database accessible by device 102). In some instances, an avatar which has been generated (e.g., derived) from the image of the user's face (e.g., such as the video frame optionally extracted in block 20) can be selected for use in video reconstruction. In some other instances, however, an avatar which has not been directly derived from the image of the user's face can be selected. That is, other two-dimensional (2-D) and three-dimensional (3-D) avatars (e.g., an animated movie character, a cartoon creature, a historical figure, etc.) can be utilized in representing the user in reconstructing the video. In any case, the selected avatar can be used to represent the user in the resultant avatar-based video.

While avatar selection typically may be made after video recording is completed, the present disclosure is not so limited, as in a more general sense, avatar selection can be performed at any time (e.g., before, during, and/or after recording a video as in block 10). Also, the selected avatar may be changed, for example, at any time during the course of a communication session (e.g., such that multiple avatars may be utilized during a given session). In some instances, selection can be made by the user, though this is not required, as in some other instances, selection can be made automatically or otherwise without user input. In some cases, a prompt for selection of an avatar may be presented to the user. Presentation of the avatar selection prompt can occur, for example, each time a video is recorded (e.g., to allow for use of multiple or otherwise varied avatars) or only once (e.g., after the first video is recorded) to allow a user to specify a default avatar which is to be selected automatically without further input from the user (e.g., during a given communication session, time period, etc.). In some cases, a user may specify his/her default avatar and choose to forego (temporarily or permanently) being prompted to switch avatars in the future. Numerous variations will be apparent in light of this disclosure.

Figure 6:
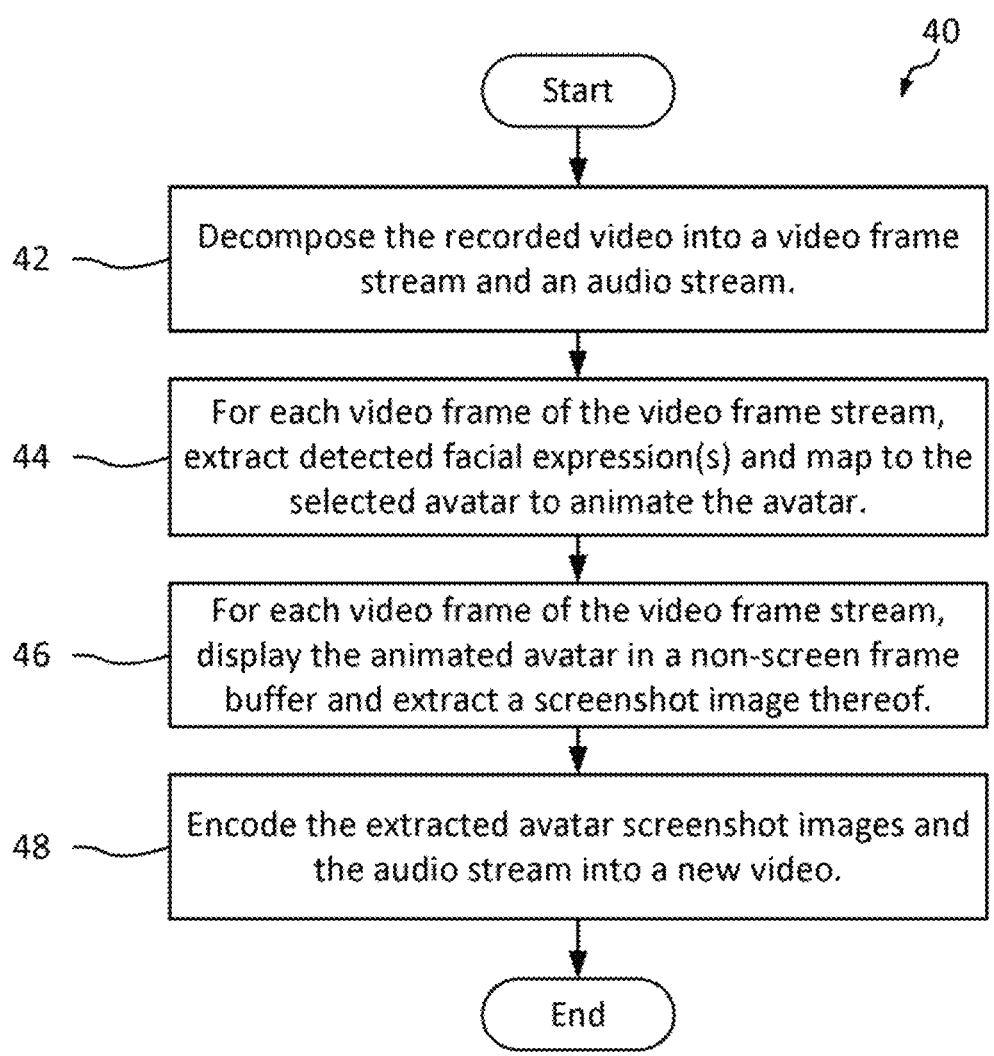
FIG. 6 illustrates an example process of reconstructing a video using an avatar, in accordance with an embodiment of the present disclosure.

The process may continue as in block 40 with reconstructing the recorded video with the selected avatar. FIG. 6 illustrates an example process of reconstructing a video using an avatar, in accordance with an embodiment of the present disclosure. As can be seen, the process can begin as in block 42 with decomposing the video recorded in block 10 (discussed above) into: (1) a video frame stream; and (2) an audio stream. As will be appreciated, there may be instances in which an audio stream need not be present (e.g., if the user records a video of a facial reaction or other facial motion which has no accompanying sound), and so in such cases only a video frame stream may be provided.

Figure 7:
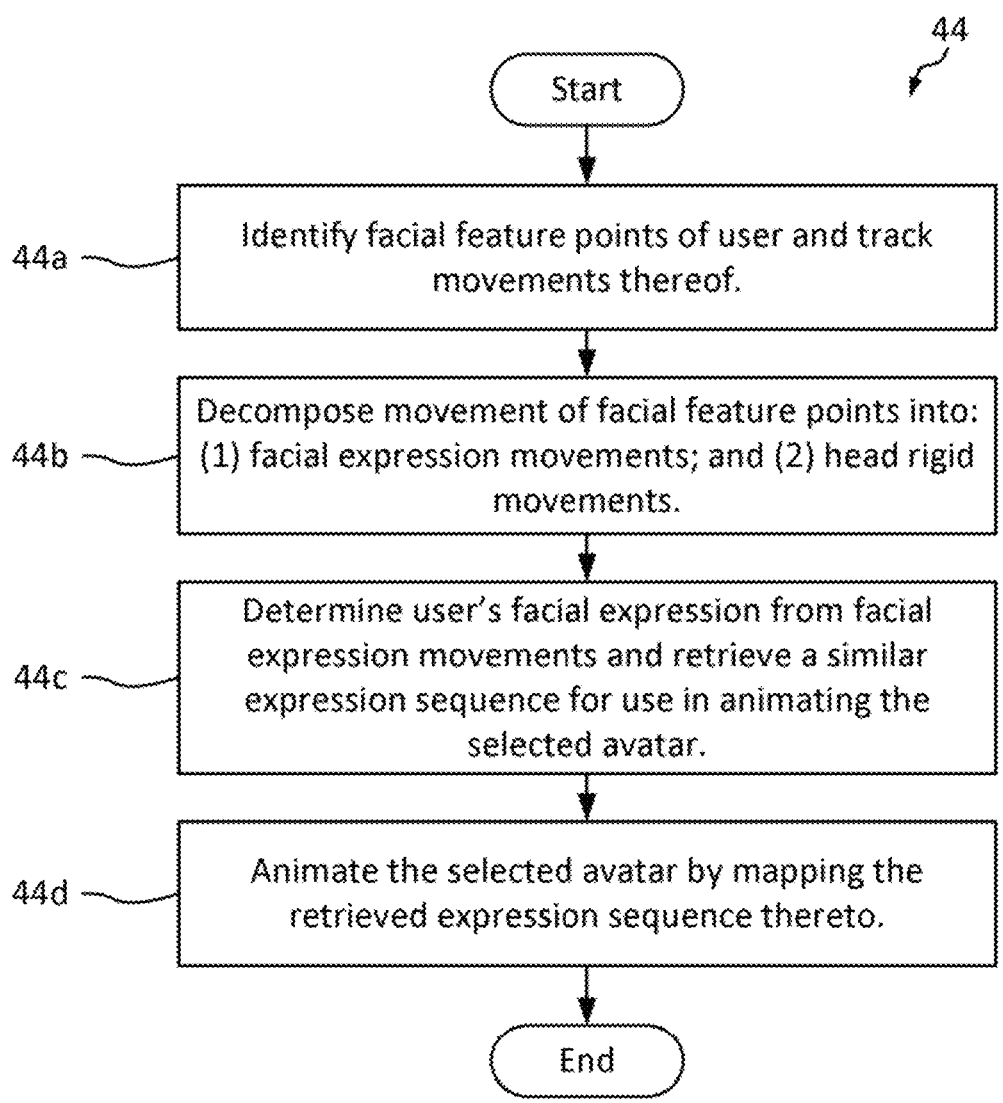
FIG. 7 illustrates an example process for extracting a detected facial expression and animating the selected avatar by mapping the facial expression thereto, in accordance with an embodiment of the present disclosure.

The process can continue as in block 44 with extracting the facial expression detected in each video frame of the video frame stream and animating the selected avatar by mapping the facial expression(s) thereto. In some cases, and in accordance with an embodiment, facial motion capture and avatar expression transfer/animation can be performed, for example, using the techniques described in PCT Application No. PCT/CN2011/072603, filed Apr. 11, 2011, and titled "Avatar Facial Expression Techniques." For instance, consider FIG. 7, which illustrates an example process for extracting a detected facial expression and animating the selected avatar by mapping the facial expression thereto, in accordance with an embodiment of the present disclosure. As can be seen, the process can begin as in block 44a with identifying the facial feature points (e.g., feature points 404) of the user and tracking movements thereof. This can be performed, for example, using face detection module 204 (e.g., by face detection/tracking module 300 thereof), as previously discussed. In some such cases, face detection module 204 can detect a face in received imaging data, as well as determine facial feature points (e.g., feature points 404) of that face. The imaging data provided to face detection module 204 can come from imaging input device 104, for example, in the form of a sequence of images or frames (e.g., video frames). In some cases, preprocessing to extract the facial features can be performed, for example, offline.

The process can continue as in block 44b with decomposing movement of the detected/tracked facial feature points into at least two categories: (1) facial expression movements; and (2) head rigid movements. The former category (facial expression movements) may include non-rigid transformations, for instance, due to facial expressions. The latter category (head rigid movements) may include rigid movements (e.g., translation, rotation, and scaling factors) due to head gestures. This also can be performed, for example, using face detection module 204, as previously discussed.

In some cases, the facial expression movements may be represented using multiple facial feature data, such as, for example: (1) the distance between upper and lower lips; (2) the distance between two mouth corners; (3) the distance between upper lip and nose tip; (4) the distance between lower lip and nose tip; (5) the distance between nose-wing and nose tip; (6) the distance between upper and lower eyelids; (7) the distance between eyebrow tip and nose-tip; (8) the distance between two eyebrow tips; and/or (9) the distance between eyebrow tip and eyebrow middle. However, the present disclosure is not so limited, as any number of multiple facial features can be used, in accordance with some other embodiments.

Next, the process can continue as in block 44c with determining the user's facial expression from the tracked facial expression movements and retrieving a similar expression sequence for use in animating the selected avatar. To that end, the tracked facial expression movements can be provided, for example, to a motion capture database module 506 (as in FIG. 4). In accordance with an embodiment, motion capture database module 506 may include or otherwise have access to an information storage medium (e.g., memory 220 or other suitable storage) having recorded/stored data for different human facial expressions and movements. In some cases, motion capture database module 506 can be included in device 102 (e.g., within avatar control module 210). However, the present disclosure is not so limited, as in some other cases, motion capture database module 506 may be remotely accessible by device 102 using wired and/or wireless communications.

Some example expressions and movements which may be recorded and stored in motion capture database module 506 may include, but are not limited to, laughter, happiness, anger, surprise, sadness, fear, disgust, speech, eating, etc. These and other facial expressions and movements can be captured and entered into the motion capture database 506, for example, using motion capture device(s) (e.g., such as the motion capture products available from Vicon Motion Systems of Oxford, UK). For example, consider FIG. 8, which illustrates a human face having a plurality of motion capture markers affixed thereto, in accordance with an embodiment of the present disclosure. As will be appreciated in light of this disclosure, any number of markers may be utilized, and in some instances, it may be desirable to utilize a quantity of motion capture markers in the range of about 30-100 markers. The associated motion capture device can capture three-dimensional (3-D) coordinates of each marker in each frame when the human performs different expressions/movements, and these coordinates may be recorded for each such expression/movement. In some cases, the motion capture of facial expressions can be performed, for example, in an offline procedure.

In any case, after the motion capture database 506 is recorded, database generation module 508 (as in FIG. 4) may generate data related to a human's different facial expressions. That is, database generation module 508 can preprocess the database by extraction of the facial features for each frame of the database. More particularly, for each frame in the database, database generation module 508 may compute multiple facial features (as previously discussed). In some embodiments, database generation module 508 can generate this data, for example, in an offline procedure. Database generation module 508 may store these features in motion capture database module 506 for subsequent retrieval.

Based on the detected facial features and movements thereof, an expression sequence that resembles (e.g., is identical or otherwise sufficiently similar to) the user's detected facial expression can be retrieved, for example, from motion capture database 506. In turn, the retrieved expression sequence representative of the detected facial expression changes can be copied to the avatar to drive the avatar in performing the same facial expression changes, as in block 44d. Avatar control module 210 can be used to control the avatar based on the expression sequence retrieved from motion capture database module 506.

In some cases, this may involve normalizing and remapping the human face to the avatar, copying the facial expression changes to the avatar, and then driving the avatar to perform the same facial expression changes as in the retrieved features. Also, in some cases, the head rigid movements can be used directly in driving the avatar. As will be appreciated in light of this disclosure, and in accordance with an embodiment, any detected face/head movements, including movement of and/or changes in one or more of the user's facial characteristics 206 (e.g., eyes, nose, mouth, etc.) can be converted into parameters usable for animating an avatar mesh (e.g., such as is discussed above with reference to the example avatar mesh of FIG. 3C).

Returning to FIG. 6, the process can continue as in block 46 with displaying the animated avatar in a non-screen frame buffer and extracting a screenshot image thereof for each video frame of the video frame stream. The avatar video frame can be created using any suitable engine, as will be apparent in light of this disclosure. For instance, in some embodiments, avatar video frame creation can be done, for example, using: (1) OpenGL application programming interface (API) or its mobile version, OpenGL for Embedded Systems (OpenGL ES), to render the animated avatar on one of the dual-frame buffers (either in hardware if a graphics processing unit is present or software if a GPU is unavailable but OpenGL driver is installed); and (2) glReadPixels (e.g., which reads a block of pixels from the frame buffer) to read the screenshot image from the frame buffer. As the frame buffer can be programmed to provide on-screen display (e.g., on device 102 or on a display otherwise associated with device 102) or not, the avatar video frame creation can be processed, for example, in a backend service, in some instances. FIGS. 9A-9C illustrate several example screenshot images of various example avatar expressions, in accordance with an embodiment of the present disclosure.

As can be seen in FIG. 6, the process can continue as in block 48 with encoding the extracted avatar screenshot images and the audio stream (if present) into a new video. In cases in which audio data is present, the resultant video can include an animated avatar accompanied by audio communication (e.g., the user's voice). In cases in which audio data is not present, the resultant video may include only an animated avatar. In any case, and in accordance with some embodiments, the resultant avatar-based animation video can accurately mimic or otherwise simulate the facial expressions and head movements produced by the user during the original video recording discussed above in the context of block 10.

Numerous variations on this methodology will be apparent in light of this disclosure. As will be appreciated, and in accordance with an embodiment, each of the functional boxes (e.g., boxes 10, 20, 30, 40, 42, 44, 46, 48, 44a, 44b, 44c, 44d) shown in FIGS. 5, 6, and 7 can be implemented, for example, as a module or sub-module that, when executed by one or more processors or otherwise operated, causes the associated functionality as described herein to be carried out. The modules/sub-modules may be implemented, for instance, in software (e.g., executable instructions stored on one or more computer readable media), firmware (e.g., embedded routines of a microcontroller or other device which may have I/O capacity for soliciting input from a user and providing responses to user requests), and/or hardware (e.g., gate level logic, field programmable gate array, purpose-built silicon, etc.).

Figure 10:
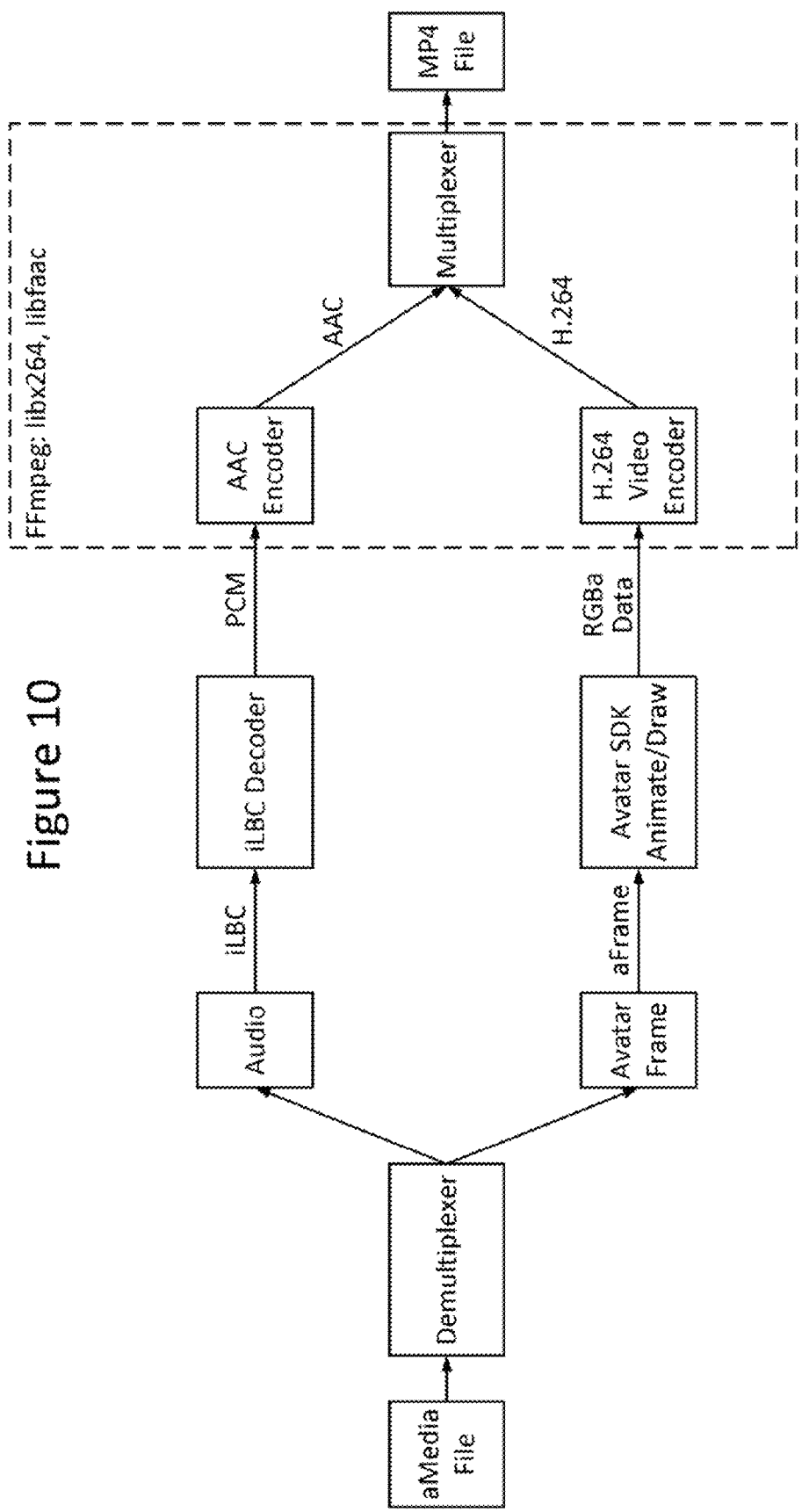
FIG. 10 is a block diagram illustrating an example video rendering flow on a server, in accordance with an embodiment of the present disclosure.

FIG. 10 is a block diagram illustrating an example video rendering flow on a server, in accordance with an embodiment of the present disclosure. As can be seen from the figure, the server can receive an aMedia file uploaded from the client. Thereafter, the aMedia file can be demultiplexed, for example, into: (1) an audio stream that is encoded, for instance, using an internet low bitrate codec (iLBC); and (2) a video frame stream (e.g., the avatar frame). The iLBC audio then can be decoded, for example, to pulse-code modulation (PCM) audio, which in turn can be encoded to the Advanced Audio Coding (AAC) scheme, for instance, using the 'libfaac' (e.g., the library of Freeware Advanced Audio Coder, or FAAC) of FFmpeg.

As can further be seen from FIG. 10, the avatar frame can be animated using a suitable software development kit (SDK), as will be apparent in light of this disclosure, and then drawn, for example, by OpenGL, which may use a graphics processing unit (GPU) for avatar model rendering. In some cases, the draw result for one video frame may be, for example, 720p (1280*720*4) RGBa data in the GPU memory buffer. Thereafter, the host computer processing unit (CPU) may get (e.g., copy) the video frame from the GPU and encode it, for instance, using codecs like H.263 or H.264/MPEG-4 Advanced Video Coding (AVC) (e.g., such as the 'libx264' of H.264 codecs of FFmpeg) or any other suitable video encoder, as will be appreciated in light of this disclosure, to compress the video data. Next, the resultant encoded audio (e.g., AAC-encoded audio) and video (e.g., H.264-encoded video) may be synced and multiplexed, for instance, using FFmpeg. The resultant multiplexed H.264 frame may be written into an MP4 file format or other desired file format, as will be apparent in light of this disclosure.

As will be appreciated in light of this disclosure, to help minimize or otherwise reduce performance bottlenecking, it may be desirable, for example, to avoid memory copy on massive data, in the example context of the flow of FIG. 10. As will be further appreciated, it may be desirable to utilize the GPU, for instance, to accelerate the H.264 encoding. In some cases, it may be desirable to use the Compute Unified Device Architecture (CUDA) parallel programming model to aid in utilizing GPU capacities. Also, in some cases, it may be desirable to utilize an asynchronous method for a user upload-rendering scenario, for example, to help improve the user experience. Numerous variations will be apparent in light of this disclosure.

Example System

Figure 11:
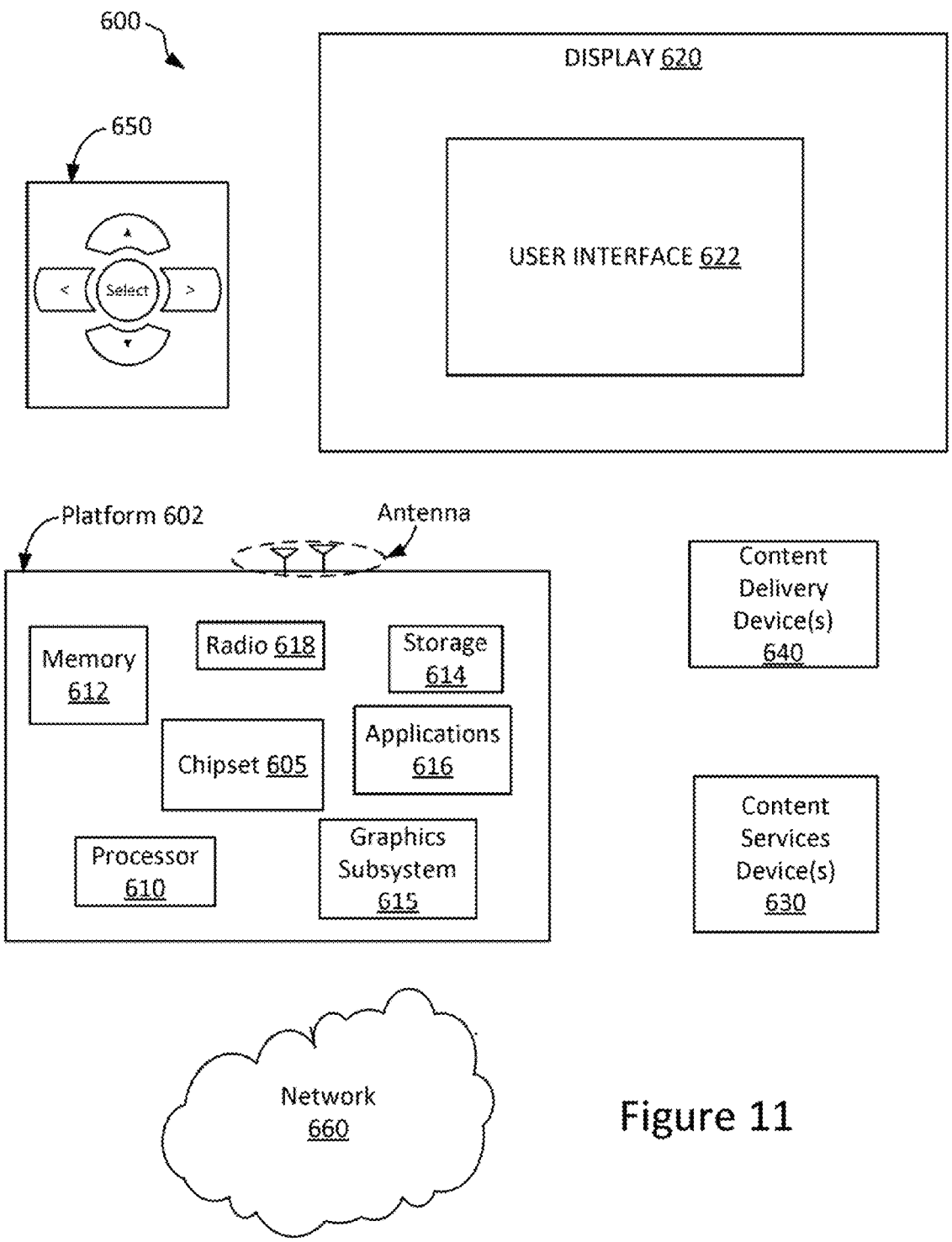
FIG. 11 illustrates an example system that may carry out the techniques for avatar-based video encoding as described herein, in accordance with some embodiments.

FIG. 11 illustrates an example system 600 that may carry out the techniques for avatar-based video encoding as described herein, in accordance with some embodiments. In some embodiments, system 600 may be a media system, although system 600 is not limited to this context. For example, system 600 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, set-top box, game console, or other such computing environments capable of performing graphics rendering operations.

In some embodiments, system 600 comprises a platform 602 coupled to a display 620. Platform 602 may receive content from a content device such as content services device(s) 630 or content delivery device(s) 640 or other similar content sources. A navigation controller 650 comprising one or more navigation features may be used to interact, for example, with platform 602 and/or display 620. Each of these example components is described in more detail below.

In some embodiments, platform 602 may comprise any combination of a chipset 605, processor 610, memory 612, storage 614, graphics subsystem 615, applications 616, and/or radio 618. Chipset 605 may provide intercommunication among processor 610, memory 612, storage 614, graphics subsystem 615, applications 616, and/or radio 618. For example, chipset 605 may include a storage adapter (not depicted) capable of providing intercommunication with storage 614.

Processor 610 may be implemented, for example, as Complex Instruction Set Computer (CISC) or Reduced Instruction Set Computer (RISC) processors, x86 instruction set compatible processors, multi-core, or any other microprocessor or central processing unit (CPU). In some embodiments, processor 610 may comprise dual-core processor(s), dual-core mobile processor(s), and so forth. Memory 612 may be implemented, for instance, as a volatile memory device such as, but not limited to, a Random Access Memory (RAM), Dynamic Random Access Memory (DRAM), or Static RAM (SRAM). Storage 614 may be implemented, for example, as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In some embodiments, storage 614 may comprise technology to increase the storage performance enhanced protection for valuable digital media when multiple hard drives are included, for example.

Graphics subsystem 615 may perform processing of images such as still or video for display. Graphics subsystem 615 may be a graphics processing unit (GPU) or a visual processing unit (VPU), for example. An analog or digital interface may be used to communicatively couple graphics subsystem 615 and display 620. For example, the interface may be any of a High-Definition Multimedia Interface (HDMI), DisplayPort, wireless HDMI, and/or wireless HD compliant techniques. Graphics subsystem 615 could be integrated into processor 610 or chipset 605. Graphics subsystem 615 could be a stand-alone card communicatively coupled to chipset 605. The techniques for avatar-based video encoding described herein may be implemented in various hardware architectures. For example, the techniques for avatar-based video encoding as provided herein may be integrated within a graphics and/or video chipset. Alternatively, a discrete security processor may be used. In still another embodiment, the graphics and/or video functions including the techniques for avatar-based video encoding may be implemented by a general purpose processor, including a multi-core processor.

Radio 618 may include one or more radios capable of transmitting and receiving signals using various suitable wireless communications techniques. Such techniques may involve communications across one or more wireless networks. Exemplary wireless networks may include, but are not limited to, wireless local area networks (WLANs), wireless personal area networks (WPANs), wireless metropolitan area network (WMANs), cellular networks, and satellite networks. In communicating across such networks, radio 618 may operate in accordance with one or more applicable standards in any version.

In some embodiments, display 620 may comprise any television or computer-type monitor or display. Display 620 may comprise, for example, a liquid crystal display (LCD) screen, electrophoretic display (EPD) or liquid paper display, flat panel display, touchscreen display, television-like device, and/or a television. Display 620 may be digital and/or analog. In some embodiments, display 620 may be a holographic or three-dimensional (3-D) display. Also, display 620 may be a transparent surface that may receive a visual projection. Such projections may convey various forms of information, images, and/or objects. For example, such projections may be a visual overlay for a mobile augmented reality (MAR) application. Under the control of one or more software applications 616, platform 602 may display a user interface 622 on display 620.

In some embodiments, content services device(s) 630 may be hosted by any national, international, and/or independent service and thus may be accessible to platform 602 via the Internet or other network, for example. Content services device(s) 630 may be coupled to platform 602 and/or to display 620. Platform 602 and/or content services device(s) 630 may be coupled to a network 660 to communicate (e.g., send and/or receive) media information to and from network 660. Content delivery device(s) 640 also may be coupled to platform 602 and/or to display 620. In some embodiments, content services device(s) 630 may comprise a cable television box, personal computer (PC), network, telephone. Internet-enabled devices or appliance capable of delivering digital information and/or content, and any other similar device capable of unidirectionally or bi-directionally communicating content between content providers and platform 602 and/or display 620, via network 660 or directly. It will be appreciated that the content may be communicated unidirectionally and/or bi-directionally to and from any one of the components in system 600 and a content provider via network 660. Examples of content may include any media information including, for example, video, music, graphics, text, medical and gaming content, and so forth.

Content services device(s) 630 receives content such as cable television programming including media information, digital information, and/or other content. Examples of content providers may include any cable or satellite television or radio or Internet content providers. The provided examples are not meant to limit the present disclosure. In some embodiments, platform 602 may receive control signals from navigation controller 650 having one or more navigation features. The navigation features of controller 650 may be used to interact with user interface 622, for example. In some embodiments, navigation controller 650 may be a pointing device that may be a computer hardware component (specifically human interface device) that allows a user to input spatial (e.g., continuous and multi-dimensional) data into a computer. Many systems such as graphical user interfaces (GUI) and televisions and monitors allow the user to control and provide data to the computer or television using physical gestures.

Movements of the navigation features of controller 650 may be echoed on a display (e.g., display 620) by movements of a pointer, cursor, focus ring, or other visual indicators displayed on the display. For example, under the control of software applications 716, the navigation features located on navigation controller 650 may be mapped to virtual navigation features displayed on user interface 622, for example. In some embodiments, controller 650 may not be a separate component but integrated into platform 602 and/or display 620. Embodiments, however, are not limited to the elements or in the context shown or described herein, as will be appreciated.

In some embodiments, drivers (not shown) may comprise technology to enable users to instantly turn on and off platform 602 like a television with the touch of a button after initial boot-up, when enabled, for example. Program logic may allow platform 602 to stream content to media adaptors or other content services device(s) 630 or content delivery device(s) 640 when the platform is turned "off" In addition, chip set 605 may comprise hardware and/or software support for 5.1 surround sound audio and/or high definition 7.1 surround sound audio, for example. Drivers may include a graphics driver for integrated graphics platforms. In some embodiments, the graphics driver may comprise a peripheral component interconnect (PCI) express graphics card.

In various embodiments, any one or more of the components shown in system 600 may be integrated. For example, platform 602 and content services device(s) 630 may be integrated, or platform 602 and content delivery device(s) 640 may be integrated, or platform 602, content services device(s) 630, and content delivery device(s) 640 may be integrated, for example. In various embodiments, platform 602 and display 620 may be an integrated unit. Display 620 and content service device(s) 630 may be integrated, or display 620 and content delivery device(s) 640 may be integrated, for example. These examples are not meant to limit the present disclosure.

In various embodiments, system 600 may be implemented as a wireless system, a wired system, or a combination of both. When implemented as a wireless system, system 600 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the radio frequency (RF) spectrum and so forth. When implemented as a wired system, system 600 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and so forth. Examples of wired communications media may include a wire, cable, metal leads, printed circuit board (PCB), backplane, switch fabric, semiconductor material, twisted-pair wire, co-axial cable, fiber optics, and so forth.

Platform 602 may establish one or more logical or physical channels to communicate information. The information may include media information and control information.

Media information may refer to any data representing content meant for a user. Examples of content may include, for example, data from a voice conversation, videoconference, streaming video, email or text messages, voice mail message, alphanumeric symbols, graphics, image, video, text and so forth. Control information may refer to any data representing commands, instructions, or control words meant for an automated system. For example, control information may be used to route media information through a system or instruct a node to process the media information in a predetermined manner (e.g., using the techniques for avatar-based video encoding as described herein). The embodiments, however, are not limited to the elements or context shown or described in FIG. 11.

Figure 12:
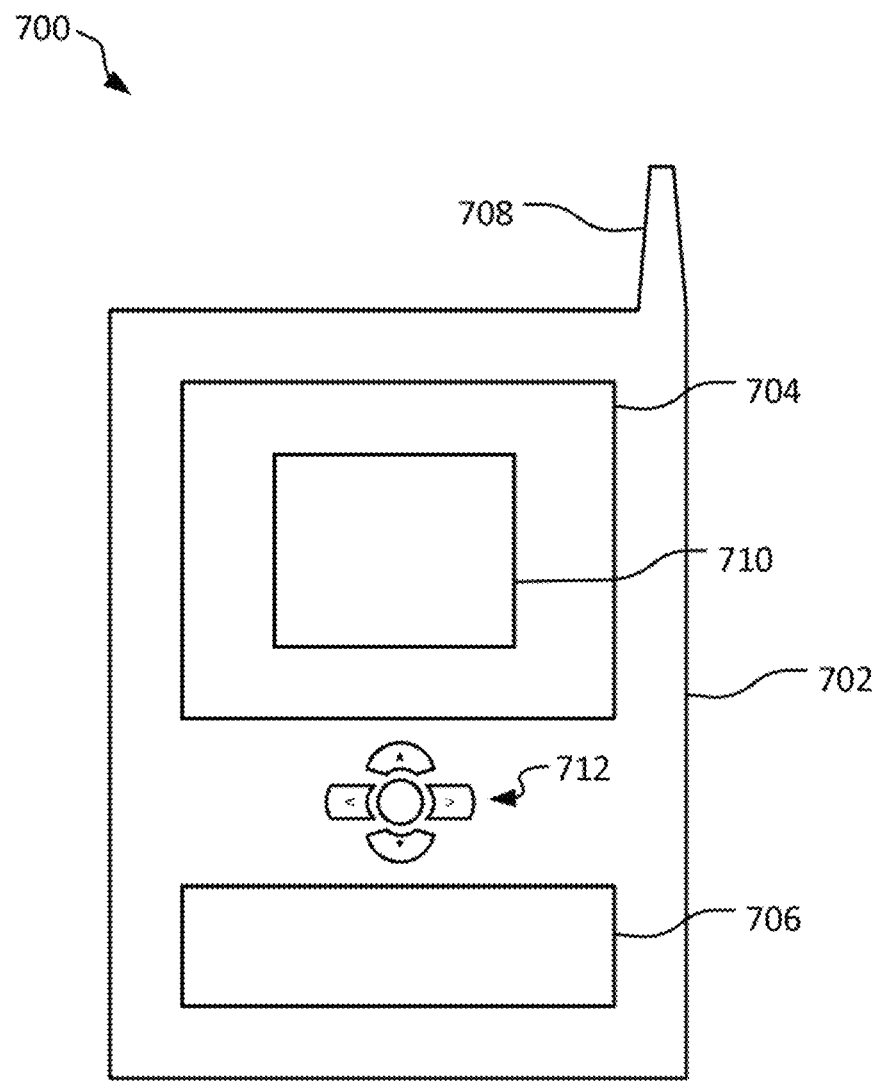
FIG. 12 illustrates embodiments of a small form factor device in which the system of FIG. 11 may be embodied.

As described above, system 600 may be embodied in varying physical styles or form factors. FIG. 12 illustrates embodiments of a small form factor device 700 in which system 600 may be embodied. In some embodiments, for example, device 700 may be implemented as a mobile computing device having wireless capabilities. A mobile computing device may refer to any device having a processing system and a mobile power source or supply, such as one or more batteries, for example.

As previously described, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, linger computer, ring computer, eyeglass computer, belt-clip computer, arm-band computer, shoe computers, clothing computers, and other wearable computers. In some embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 12, device 700 may comprise a housing 702, a display 704, an input/output (I/O) device 706, and an antenna 708. Device 700 also may comprise navigation features 712. Display 704 may comprise any suitable display unit for displaying information appropriate for a mobile computing device. I/O device 706 may comprise any suitable I/O device for entering information into a mobile computing device. Examples for I/O device 706 may include an alphanumeric keyboard, a numeric keypad, a touch pad, input keys, buttons, switches, rocker switches, microphones, speakers, voice recognition device and software, and so forth. Information also may be entered into device 700 by way of microphone. Such information may be digitized by a voice recognition device. The embodiments are not limited in this context.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits (IC), application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Whether hardware elements and/or software elements are used may vary from one embodiment to the next in accordance with any number of factors, such as desired computational rate, power levels, heat tolerances, processing cycle budget, input data rates, output data rates, memory resources, data bus speeds, and other design or performance constraints.

Some embodiments may be implemented, for example, using a machine-readable medium or article which may store an instruction or a set of instructions that, if executed by a machine, may cause the machine to perform a method and/or operations in accordance with an embodiment. Such a machine may include, for example, any suitable processing platform, computing platform, computing device, processing device, computing system, processing system, computer, processor, or the like, and may be implemented using any suitable combination of hardware and software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R). Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of executable code implemented using any suitable high-level, low-level, object-oriented, visual, compiled, and/or interpreted programming language.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers, or other such information storage, transmission, or displays. The embodiments are not limited in this context.

Further Example Embodiments

The following examples pertain to further embodiments, from which numerous permutations and configurations will be apparent.

Example 1 is a method of avatar-based video encoding, the method comprising: recording a video of a user; and reconstructing the recorded video as an avatar-based video using an avatar that is based on one or more facial expressions of the user detected during video recording.

Example 2 includes the subject matter of any of Examples 1 and 3-21, wherein reconstructing the recorded video as the avatar-based video comprises: decomposing the recorded video into a video frame stream comprising a plurality of video frames; for each video frame of the video frame stream, extracting detected facial expression(s) of the user and mapping them to the avatar to animate the avatar; for each video frame of the video frame stream, presenting the resultant animated avatar in a non-screen frame buffer and extracting a screenshot image thereof; and encoding the extracted avatar screenshot image(s) to provide the avatar-based video.

Example 3 includes the subject matter of any of Examples 2 and 4-21, wherein extracting detected facial expression(s) of the user and mapping them to the avatar to animate the avatar comprises: identifying facial feature points of the user and tracking movements thereof; determining facial expression(s) from movement of the facial feature points; retrieving expression sequence(s) similar to the facial expression(s); and animating the avatar by mapping the retrieved expression sequence(s) thereto.

Example 4 includes the subject matter of any of Examples 2-3 and 5-21, wherein presenting the resultant animated avatar in a non-screen frame buffer is performed using an OpenGL application programming interface or an OpenGL for Embedded Systems (OpenGL ES) application programming interface.

Example 5 includes the subject matter of any of Examples 2-4 and 6-21, wherein extracting a screenshot image is performed using glReadPixels.

Example 6 includes the subject matter of any of Examples 2-5 and 8-21, wherein encoding the extracted avatar screenshot image(s) is performed using a video encoder.

Example 7 includes the subject matter of Example 6, wherein encoding the extracted avatar screenshot image(s) is performed using an H.263 codec or an H.264/MPEG-4 Advanced Video Coding (AVC) codec.

Example 8 includes the subject matter of any of Examples 2-7 and 9-21, wherein the decomposing further comprises decomposing the recorded video into an audio stream, and the encoding further comprises combining the extracted avatar screenshot image(s) with the audio stream to provide the avatar-based video.

Example 9 includes the subject matter of Example 8, wherein the audio stream is encoded using an Advanced Audio Coding (AAC) codec.

Example 10 includes the subject matter of any of Examples 1-9 and 11-21, wherein prior to reconstructing the recorded video as the avatar-based video, the method further comprises: receiving a selection of the avatar to represent the user.

Example 11 includes the subject matter of Example 10, wherein selection of the avatar is made automatically from a database containing one or more available avatars.

Example 12 includes the subject matter of Example 10, wherein selection of the avatar is made without user input.

Example 13 includes the subject matter of Example 10, wherein selection of the avatar is based on user input.

Example 14 includes the subject matter of any of Examples 1-13 and 15-21, wherein during recording the video of the user, the method further comprises: extracting from the video a video frame which captures a front-face image of the user; and generating the avatar from the front-face image of the user.

Example 15 includes the subject matter of Example 14, wherein after generating the avatar from the front-face image of the user but prior to reconstructing the recorded video as the avatar-based video, the method further comprises: receiving a selection of the avatar generated from the extracted video frame to represent the user.

Example 16 includes the subject matter of Example 15, wherein selection of the avatar generated from the front-face image of the user is made without user input.

Example 17 includes the subject matter of Example 15, wherein selection of the avatar generated from the front-face image of the user is made based on user input.

Example 18 includes the subject matter of any of Examples 1-17, wherein recording the video of the user includes activating a video recording application based on user input or an always-on video sensor that triggers recording.

Example 19 includes the subject matter of any of Examples 1-17, wherein the avatar-based video has a file size that is about 20-70% less than the recorded video.

Example 20 includes the subject matter of any of Examples 1-17, wherein the avatar-based video is in MP4 file format.

Example 21 includes the subject matter of any of Examples 1-17, wherein the avatar-based video is provided with a static image background.

Example 22 is a computer-readable medium encoded with instructions that, when executed by one or more processors, causes a process for avatar-based video encoding to be carried out, the process comprising the subject matter of any of Examples 1-21.

Example 23 is a system comprising: a video device configured to record video; an imaging and audio framework module configured to receive and interpret video input from the video device; a face detection module operatively coupled with the imaging and audio framework module and configured to detect a face within the video input and to track changes in facial characteristics of the detected face; an avatar database having one or more avatars stored therein; and an avatar control module configured to animate a selected avatar using changes in facial characteristics of the detected face as tracked by the face detection module.

Example 24 includes the subject matter of any of Examples 23 and 25-32 and further comprises a communication module configured for at least one of wired and/or wireless communication with a network.

Example 25 includes the subject matter of any of Examples 23-24 and 26-32, wherein at least one avatar stored in the avatar database is generated by a remote content provider.

Example 26 includes the subject matter of any of Examples 23-25 and 27-32, wherein at least one avatar stored in the avatar database is generated from a video frame of the video input recorded by the video device.

Example 27 includes the subject matter of any of Examples 23-26 and 28-32 and further comprises a memory module configured to store an application for causing the video device to record the video.

Example 28 includes the subject matter of Example 27, wherein the memory module is further configured to store at least one of an operating system (OS) and/or a user interface (UI).

Example 29 includes the subject matter of any of Examples 23-28 and 30-32, wherein the video device comprises a camera.

Example 30 includes the subject matter of any of Examples 23-29 and 31-32, wherein the video device comprises a microphone.

Example 31 includes the subject matter of any of Examples 23-30 and 32 and further comprises an audio output device.

Example 32 includes the subject matter of Example 31, wherein the audio output device comprises a speaker.

Example 33 is a computing device including the subject matter of any of Examples 23-32.

Example 34 includes the subject matter of any of Examples 33 and 35-36, wherein the computing device comprises at least one of a laptop/notebook computer, a tablet computer, a mobile phone, a smartphone, a personal digital assistant (PDA), a cellular handset, a handheld gaming device, a gaming platform, a desktop computer, and/or a videoconferencing system.

Example 35 includes the subject matter of any of Examples 33-34 and 36, wherein the computing device is configured for at least one of wired and/or wireless communication with a network.

Example 36 includes the subject matter of any of Examples 33-35, wherein the computing device is configured for at least one of wired and/or wireless communication with a remote computing device.

Example 37 is a system comprising: an avatar database having one or more avatars stored therein; and a mobile computing device configured to: record a video; detect a face within the video; track changes in facial characteristics of the detected face, and reconstruct the recorded video as an avatar-based video using an avatar that is animated using the tracked changes in facial characteristics of the detected face.

Example 38 includes the subject matter of any of Examples 37 and 40-43, wherein the mobile computing device is further configured to generate an avatar derived from the detected face.

Example 39 includes the subject matter of Example 38, wherein the avatar used in reconstructing the recorded video comprises the avatar generated from the detected face.

Example 40 includes the subject matter of any of Examples 37-39 and 41-43, wherein the mobile computing device is further configured to communicate with a network.

Example 41 includes the subject matter of Example 40, wherein the network comprises at least one of a second-generation (2G) mobile communication network, a third-generation (3G) mobile communication network, a fourth-generation (4G) mobile communication network, and/or a wireless local area network (WLAN).

Example 42 includes the subject matter of any of Examples 37-41, wherein the avatar is two-dimensional (2-D).

Example 43 includes the subject matter of any of Examples 37-41, wherein the avatar is three-dimensional (3-D).

The foregoing description of example embodiments has been presented for the purposes of illustration and description. It is not intended to be exhaustive or to limit the present disclosure to the precise forms disclosed. Many modifications and variations are possible in light of this disclosure. It is intended that the scope of the present disclosure be limited not by this detailed description, but rather by the claims appended hereto. Future-filed applications claiming priority to this application may claim the disclosed subject matter in a different manner and generally may include any set of one or more limitations as variously disclosed or otherwise demonstrated herein.

What is claimed is:

1. A non-transitory computer-readable medium encoded with instructions that, when executed by one or more processors, cause a process for avatar-based video encoding to be carried out, the process comprising:
   recording a video of a user;
   extracting from the video a video frame that captures a front-face image of the user;
   constructing from the front-face image of the user an avatar model configured to be animated based on one or more facial expressions of the user detected during video recording; and
   reconstructing the recorded video as an avatar-based video using the avatar model, wherein reconstructing comprises categorizing a first movement of the user in the recorded video as a head rigid movement, categorizing a second movement of the user in the recorded video as a facial expression movement, and processing the second movement as a facial expression in response to categorizing the second movement.

2. The non-transitory computer-readable medium of claim 1, wherein reconstructing the recorded video as the avatar-based video comprises:
   decomposing the recorded video into a video frame stream comprising a plurality of video frames;
   for at least one video frame of the video frame stream, extracting detected facial expression(s) of the user and mapping them to the avatar model to animate that avatar model;
   for each video frame of the video frame stream, presenting a resultant animated avatar model in a non-screen frame buffer and extracting a screenshot image thereof; and
   encoding the extracted avatar model screenshot image(s) to provide the avatar-based video.

3. The non-transitory computer-readable medium of claim 2, wherein extracting detected facial expression(s) of the user and mapping them to the avatar model to animate that avatar model comprises:
   identifying facial feature points of the user and tracking movements thereof;
   determining facial expression(s) from movement of the facial feature points;
   retrieving expression sequence(s) similar to the facial expression(s); and
   animating the avatar model by mapping the retrieved expression sequence(s) thereto.

4. The non-transitory computer-readable medium of claim 2, wherein presenting the resultant animated avatar model in a non-screen frame buffer is performed using an OpenGL application programming interface or an OpenGL for Embedded Systems (OpenGL ES) application programming interface.

5. The non-transitory computer-readable medium of claim 2, wherein extracting a screenshot image is performed using glReadPixels.

6. The non-transitory computer-readable medium of claim 2, wherein the first avatar model is two-dimensional.

7. The non-transitory computer-readable medium of claim 2, wherein the decomposing further comprises decomposing the recorded video into an audio stream, and the encoding further comprises combining the extracted avatar model screenshot image(s) with the audio stream to provide the avatar-based video.

8. The non-transitory computer-readable medium of claim 1, wherein prior to reconstructing the recorded video as the avatar-based video, the process further comprises:
   receiving a selection of the avatar model to represent the user.

9. The non-transitory computer-readable medium of claim 1, wherein the first avatar model is three-dimensional.

10. The non-transitory computer-readable medium of claim 1, wherein after constructing the first avatar model from the front-face image of the user but prior to reconstructing the recorded video as the avatar-based video, the process further comprises:
receiving a selection of the avatar model.

11. The non-transitory computer-readable medium of claim 1, wherein recording the video of the user includes activating a video recording application based on user input or an always-on video sensor that triggers recording.

12. The non-transitory computer-readable medium of claim 1, wherein the avatar-based video has a file size that is about 20-70% less than the recorded video.

13. The non-transitory computer-readable medium of claim 1, wherein the avatar-based video is in MP4 file format.

14. The non-transitory computer-readable medium of claim 1, wherein the avatar-based video is provided with a static image background.

15. A system comprising:
a video device configured to record video;
an imaging and audio framework module configured to receive and interpret video input from the video device;
a face detection module operatively coupled with the imaging and audio framework module and configured to detect a face within the video input and to track changes in facial characteristics of the detected face, wherein the face detection module is further configured to track changes in facial characteristics at least in part by categorizing a first movement of the face as a head rigid movement, categorizing a second movement of the face as a facial expression movement, and processing the second movement as a facial expression in response to categorizing the second movement;
an avatar database having one or more avatars stored therein, including at least one avatar provided by an avatar model constructed from the detected face; and
an avatar control module configured to animate a selected avatar using changes in facial characteristics of the detected face, as tracked by the face detection module, in reconstruction of the video as an avatar-based video.

16. The system of claim 15, wherein at least one avatar stored in the avatar database is generated by a remote content provider.

17. The system of claim 15, wherein at least one avatar stored in the avatar database is generated from a video frame of the video input recorded by the video device.

18. The system of claim 15, wherein the video device comprises at least one of a camera, a microphone, and a speaker.

19. A computing device comprising the system of claim 15.

20. The computing device of claim 19, wherein the computing device comprises at least one of a laptop/notebook computer, a tablet computer, a mobile phone, a smartphone, a personal digital assistant (PDA), a cellular handset, a handheld gaming device, a gaming platform, a desktop computer, and a videoconferencing system.

21. The system of claim 19, wherein the computing device is configured for at least one of wired and wireless communication with a network.

22. The system of claim 19, wherein the computing device is configured for at least one of wired and wireless communication with a remote computing device.

23. A system comprising:
a mobile computing device configured to:
record a video;
detect a face within the video;
track changes in facial characteristics of the detected face; and
reconstruct the recorded video as an avatar-based video using an avatar that is animated using the tracked changes in facial characteristics of the detected face, wherein to reconstruct comprises to categorize a first movement of the user in the recorded video as a head rigid movement, to categorize a second movement of the user in the recorded video as a facial expression movement, and to process the second movement as a facial expression in response to categorizing the second movement; and
an avatar database having one or more avatars stored therein, including at least one avatar provided by an avatar model constructed from the detected face.

24. The system of claim 23, wherein:
the mobile computing device is further configured to construct the avatar model from the detected face; and
the avatar used in reconstructing the recorded video as an avatar-based video is the avatar provided by the avatar model constructed from the detected face.

25. The system of claim 23, wherein the mobile computing device is further configured to communicate with a network comprising at least one of a second-generation (2G) mobile communication network, a third-generation (3G) mobile communication network, a fourth-generation (4G) mobile communication network, and a wireless local area network (WLAN).

* * * * *